(12) United States Patent
Kawaguchi et al.

(10) Patent No.: US 9,223,463 B1
(45) Date of Patent: Dec. 29, 2015

(54) MOBILE USER INTERFACE FOR A PICKER APPLICATION

(75) Inventors: Ryo Kawaguchi, Meguro-ku (JP);
Masanori Goto, Tokyo (JP); Takahiro Kosakai, Tokyo (JP); Keiji Maekawa, Tokyo (JP); Hector Ouilhet, Tokyo (JP); Taj J. Campbell, Meguro-ku (JP)

(73) Assignee: GOOGLE INC., Moutain View, CA (US)

( * ) Notice: Subject to any disclaimer, the term of this patent is extended or adjusted under 35 U.S.C. 154(b) by 749 days.

(21) Appl. No.: 13/454,758

(22) Filed: Apr. 24, 2012

(51) Int. Cl.
*G06F 3/0482* (2013.01)
*G06F 3/0481* (2013.01)
*G06F 3/0484* (2013.01)
*G06F 3/0488* (2013.01)

(52) U.S. Cl.
CPC ............ *G06F 3/0481* (2013.01); *G06F 3/0482* (2013.01); *G06F 3/04847* (2013.01); *G06F 3/04883* (2013.01); *G06F 2203/04807* (2013.01)

(58) Field of Classification Search
CPC ........................................ G06F 3/048–3/04897
USPC .................................................. 715/810–845
See application file for complete search history.

(56) References Cited

U.S. PATENT DOCUMENTS

| | | | |
|---|---|---|---|
| 7,509,348 B2 | 3/2009 | Burtner et al. | |
| 7,676,763 B2 | 3/2010 | Rummel | |
| 2004/0155907 A1* | 8/2004 | Yamaguchi et al. | 345/810 |
| 2007/0101296 A1 | 5/2007 | Won et al. | |
| 2009/0012955 A1* | 1/2009 | Chu et al. | 707/5 |
| 2009/0033633 A1* | 2/2009 | Newman et al. | 345/173 |
| 2010/0058196 A1* | 3/2010 | Krishnan et al. | 715/747 |
| 2010/0095240 A1 | 4/2010 | Shiplacoff et al. | |
| 2010/0153844 A1 | 6/2010 | Hwang et al. | |
| 2011/0022299 A1* | 1/2011 | Feng et al. | 701/201 |
| 2011/0047509 A1* | 2/2011 | Arrasvuori | 715/815 |
| 2011/0320981 A1* | 12/2011 | Shen et al. | 715/834 |
| 2012/0042283 A1* | 2/2012 | Tuesta et al. | 715/834 |
| 2012/0194547 A1* | 8/2012 | Johnson et al. | 345/632 |
| 2012/0214505 A1* | 8/2012 | Kaido et al. | 455/456.1 |
| 2012/0317198 A1* | 12/2012 | Patton et al. | 709/204 |
| 2013/0093787 A1* | 4/2013 | Fulks et al. | 345/629 |
| 2013/0127911 A1* | 5/2013 | Brown | 345/649 |

FOREIGN PATENT DOCUMENTS

| WO | WO-01/07996 | 2/2001 |
|---|---|---|
| WO | WO-2009/055501 | 4/2009 |

OTHER PUBLICATIONS

Smarterphone "Radial"—A New Concept for Mobile Phone User Interfaces from Smarterphone, 4 pages, (2011), http://www.smarterphone.com/documents/Radialconcept.userinterface.pdf (retrieved on Feb. 10, 2012).

(Continued)

*Primary Examiner* — Kieu Vu
*Assistant Examiner* — Shangao Zhang
(74) *Attorney, Agent, or Firm* — Marshall, Gerstein & Borun LLP

(57) ABSTRACT

A user interface of a mobile computing device having a mobile operating system and a display device utilizes a picker application to facilitate selection of an activity. More specifically, the picker application presents at least one radial list of items to provide an effective process for selecting activities categorized amongst one or more locales or neighborhoods associated with a location.

20 Claims, 21 Drawing Sheets

(56) References Cited

OTHER PUBLICATIONS

"Glass CMD for Vista", Windows FXS Blog, http://windowsfxs.blogspot.com, 7 pages (retrieved on Feb. 10, 2012).

"More MeeGo Phone UI Screenshots—Dual Lock Screen, Highly Customizable Themes and UI Mechanics", My Nokia Blog, http://mynokiablog.com/2010/09/03/more-meego-phone-ui-screenshots-dual-lock-screen-highly-customizable-themes-and-ui-mechanics/, 10 pages (retrieved on Feb. 10, 2012).

U.S. Appl. No. 13/454,790, "Stacking Mobile User Interface for Moving Between Levels Within a Hierarchy," Ryo Kawaguchi et al., filed Apr. 24, 2012.

U.S. Appl. No. 29/419,000, "User Interface for a Display Screen," Hector Ouilhet, filed Apr. 24, 2012.

U.S. Appl. No. 29/419,005, "User Interface for a Display Screen," Hector Ouilhet, filed Apr. 24, 2012.

\* cited by examiner

MOBILE USER INTERFACE FOR A PICKER APPLICATION

FIELD OF DISCLOSURE

The present disclosure relates to user interfaces and, more specifically, to displaying location-based information on a display screen of a portable device.

BACKGROUND

Many mobile computing devices such as mobile phones, navigators, electronic books, and the like provide functionality beyond that of their initial intended design. The ever increasing capabilities of the mobile phone in particular has propelled its use into areas once generally believed to be limited exclusively to fixed-base or fixed-line devices, such as displaying video or browsing the Web. This convergence of the Internet and the mobile phone has vaulted the popularity of mobile access to the Web to rival that of fixed-line access, and has fostered the growth of location-based services (LBS), such as entertainment, social, and/or information.

Although its popularity continues to increase, the mobile Web is not without its own problematic concerns. Usability issues exist and one issue in particular is associated with the physically smaller viewing area of the display screen typically used in portable devices. The smaller display screen inherently tends to detract from or hamper some of the capabilities of a web-enabled and/or LBS-capable mobile computing device, e.g., fewer windows, crowded screen navigation, and broken and compressed pages. Another issue that portable device users encounter relates to navigating among multiple pages of information displayed on the smaller display screen. It is not uncommon for a user to lose track, at least temporarily, of his current position within the several layers of information viewed on the display screen.

Although advancements have been made to enhance the visual experience with respect to the limited viewing area of the portable device, there remains a need for a more effectual appearance of considerable amounts of content rendered on smaller display screens.

SUMMARY

An apparatus and method of providing location-based information via a user interface of a portable device. An example method includes receiving, at the portable device, location-based information including an indication of entities available at a plurality of geographic areas proximate to a geographic point location associated with the portable device, and displaying, via the user interface, a radial list including a plurality of selectable items, including displaying each of the plurality of selectable items inside a respective shape radially positioned about a hub, wherein each of the plurality of selectable items represents a respective group of one or more entities associated with a common geographic area.

A method according to another example implementation includes receiving, at the portable device, location-based information including an indication of entities available at a plurality of geographic areas proximate to a geographic point location associated with the portable device, and displaying, via the user interface, a first radial list of a plurality of selectable items, including displaying each of the plurality of selectable items inside a respective shape radially positioned about a first hub representing the geographic point location associated with the portable device, wherein each of the plurality of selectable items represents a respective group of one or more entities associated with a common geographic area. The method also includes displaying, via the user interface, a second radial list of a plurality of selectable sub-items, including displaying each of the plurality of selectable sub-items inside a respective shape radially positioned about a second hub, wherein each of the plurality of selectable sub-items represents a respective group of one or more entities associated with a common activity.

In another example implementation, a mobile computing device capable of displaying location-based information on a display screen includes a processor coupled to a memory and a display screen, a user interface coupled to the processor and the display screen, and a radial list including a plurality of selectable items radially displayed about a hub on the display screen, wherein each of the plurality of selectable items includes a shape and represents a respective group of one or more entities associated with a common geographic area.

DETAILED DESCRIPTION

Figure 1:
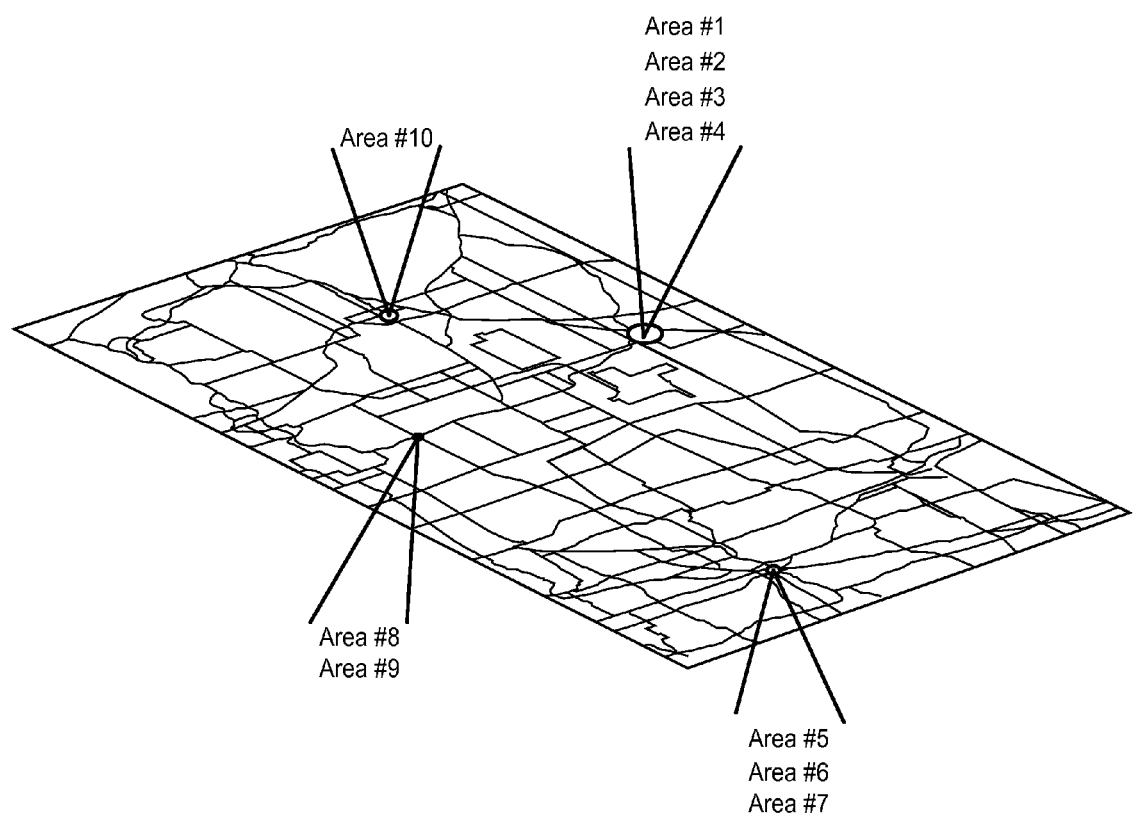
FIG. 1 illustrates a map generally depicting the location of several areas, with one or more activities typically being available in each area.

Using the techniques described below, a navigation module interface presents information on a display screen of a portable device in a manner that allows software applications to efficiently utilize the screen "real estate" and clearly guide the user through various categories of the presented information. Generally speaking, the navigation module interface provides selections of information in a radial list of items and sub-items, one or more stacks of windows, or both.

The radial list may be associated with a geographic position. For example, a server can provide location-based information that includes an indication of entities available at several geographic areas near a location associated with the portable device, which may be the current location of the portable device or a location selected by a user. Items and sub-items representing a group or groups of one or more entities are displayed within a radial list on a display screen. In one implementation, the radial list is essentially a list with contents dispersed in a circular manner about a perimeter surrounding a point or hub. Several instances of the radial list may be generated at different stages of navigation through the available information. For example, a first radial list includes items that correspond to groups of one or more entities associated with common geographic areas. The items are radially positioned about a hub on the display screen. Selection of a particular item from the first radial list triggers the display of a second radial list having sub-items that correspond to a group of one or more entities associated with a common activity. Although both radial lists are displayed separately on the display screen, the positioning of each respective hub may be coordinately aligned on the display screen.

Each item or sub-item in either radial list may be depicted by a shape on the display screen. Further, each item may include indications in the form of icons, for examples, of the types of activities available in the corresponding geographic area. A navigation module interface may dynamically determine the number of items to be included in each radial list, the relative positioning of the items, the types of icons or other indicators to be displayed for each item, etc. based on the availability of relevant information. In some implementations, the navigation module interface displays a radial list in a perspective view so as to cause certain items to appear larger (i.e., closer) and some items to appear smaller (i.e., farther away from the viewer). In this manner, more information can be made clearly visible to the user for an item appearing in the foreground. Further, the navigation module interface may cause the list to rotate automatically or in response to a "swipe" gesture, for example, via which the user may communicate a momentum to the list. During rotation, items that are not currently in the foreground may be partially clipped or may partially or completely momentarily disappear from the screen, thus leaving more screen real estate to the item currently in the foreground. In this manner, a relatively large amount of information can be clearly presented on the display screen.

In some situations, such as in response to detecting a selection of a certain item in the second radial list, the navigation module interface generates a stack of windows, each window including a header segment and a content segment. The relative placement of windows in a stack reflects the hierarchy of information provided in the windows, with a window presenting more particular information being displayed on top of a window presenting more general information. More particularly, a new window may be displayed on top of an old window in response to the user selecting one of the options in the old window.

The uppermost window may obscure the underlying windows, but the header portions of all windows in the stack may be arranged so that the designations (e.g., text, images) in each header remain visible. In one implementation, the header segments of a window overlying another window is rendered in a semi-transparent form, and the information in both the header of the overlying window and the header of the underlying window is readable or otherwise recognizable. Moreover, in some cases, the underlying windows are progressively reduced in size so that these windows appear to recede into the distance. In this manner, more screen real estate can be reserved for the uppermost window.

These and other techniques are discussed in more detail below with reference to FIGS. 1-11. Referring first to FIG. 1, a sketch of a region includes several geographic areas, e.g., neighborhoods, districts, locales. Within each geographic area, one or more entities may be located where activities such as dining, shopping, night life, etc. may be available. The geographic areas are likely known as identifiable areas, and one or more may exist within a city or town. For example, the geographic areas may include West Loop, Hell's Kitchen, Strip, Magnificent Mile, River Walk, Rush Street, or Cannery Row. In some cases, a geographic area may be akin to a community, which sometimes is denser than a neighborhood or locale. In yet other cases, a geographic area is not generally recognized as a neighborhood or a community but includes a high number of entities of a particular type (e.g., theaters) within a relatively small distance of each other, and accordingly may be treated as a geographic area (e.g., theater district) for the purposes of presenting information to a user using the techniques of the present disclosure.

Figure 2:
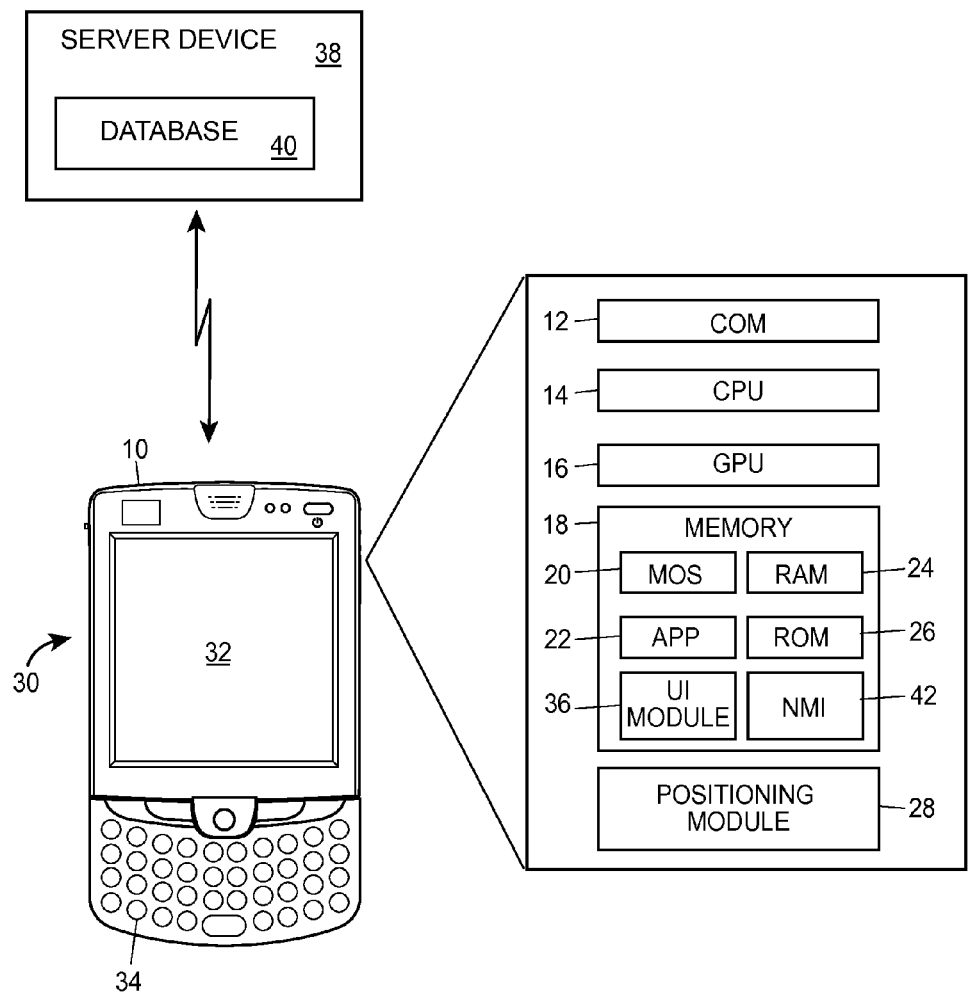
FIG. 2 is a high-level block diagram of an example mobile computing device that implements the techniques of the present disclosure to display an activity picker application and/or selectable windows on a display screen.

FIG. 2 depicts an example computing device 10 that implements some or all of the techniques of this disclosure. The computing device 10 is shown to be a portable device, e.g., smartphone, but it is to be understood that the computing device 10 may be any other type of computing device, including, and not limited to, a personal desktop or laptop computer, a navigator, an e-reader, and a music player. The portable device 10 includes various modules, which may be implemented using hardware, software, or a combination of hardware and software. The modules include a communication module (COM) 12, at least one central processing unit (CPU) or processor 14, and a graphics processing unit (GPU) 16. The communication module 12 is capable of facilitating wireless mobile communication via any known protocol stack, such as 3G, 4G, GSM, WiFi, Bluetooth, etc.

The mobile computing device 10 also includes a memory 18, which may include any type of memory capable of being incorporated with a mobile computing device, including random access memory 24 (RAM) and read only memory 26 (ROM). Stored within the memory 18 are an operating system 20 and at least one application 22, both of which may be executed by the processor 14. The application 22 may be a special-purpose application for viewing location-based content or a general-purpose application such as a web browser, for example. The operating system 20 in general may be any type of operating system capable of being executed on non-portable or portable computing devices. In mobile applications, the mobile operating system may be specifically designed for, or capable of being used on, the mobile computing device, such as Android, iOS, Symbian, etc. The computing device 10 also includes a user interface (UI) 30, which may include a display screen 32 and a keyboard 34 as well as a user interface module 36.

A navigation module interface 42 may be a software module stored in the memory 18. For clarity, the navigation module interface 42 is depicted in FIG. 2 as a separate module. However, the navigation module interface 42 in general can be provided in any suitable form. For example, the navigation module interface 42 may be a compiled library that the application 22 (as well as other applications) can invoke via a predefined application programming interface (API), a script which the application 22 may interpret at runtime, a separate application, etc.

A track-pad, track-ball, thumb-wheel, touch-screen, and the like may also be integrated and/or incorporated with the user interface 30, the user interface module 36, and/or the navigation module interface 42. The mobile computing device 10 also includes a mobile positioning unit (MPU) 28 that may incorporate any type of position locating technology component(s) capable of attaining a geographic location, e.g., networked-based, global positioning system (GPS), etc. In some cases, the MPU 28 implements hotspot triangulation techniques and operates as a component or a function of a Wi-Fi communication module, for example.

The application 22 residing within the portable device 10 may be downloaded or input into the memory 18 of the mobile computing device 10 by a wired or wireless transfer, a portable memory device, or any other known means. When executed by the processor 14, the application 22 presents information visually on the display screen 32. In particular, the portable device 10 may receive information compiled by a server device 38 and stored in a database 40. The information may pertain to entertainment, business, or social activities and, in at least some of the cases, may be location-based information associated with a particular location. The particular location, or "point location," is associated with the portable device 10 and may be acquired by the MPU 28 of the portable device 10. Alternatively, the point location (e.g., city name, address, ZIP code) may be received by the portable device 10 from the user via the user interface 30. In the case where the point location is entered into the portable device 10 via the user interface 30, the point location may not coincide with the actual physical location of the portable device 10. That is, a geographic location other than the current physical location of the portable device 10 may be used as the point location. In either case however, the point location can be considered to be associated with the portable device 10.

Information received by the portable device 10 from the server device 38 may be configured for display in several windows on the display screen 32. As discussed in more detail below, the content displayed in the windows may be categorically interconnected or linked. The information displayed on the display screen 32 may be categorized by topic and/or geography and associated in a hierarchical context, such as in a category, subcategory, sub-subcategory, article, etc., association.

In one example method, the application 22 is capable of presenting location-based information on the display screen 32. When executed by the one or more the processors 14 of the mobile computing device 10, the application 22 displays location-based information relating to activities available at entities or establishments categorized among one or more geographic areas situated about the point location. In response to a request for a list of activities received at the portable device 10, the portable device initiates a request for a list of activities to the server device 38. The request for a list of activities to the server device 38 may include information pertaining to the geographic position of a point location as well as user-specific information. In response to the request for a list of activities received from the mobile computing device 10, the server device 38 and its database 40 provide compiled activity information to the portable device 10.

The location-based information may include activity information that indicates locations of entities and activities available at these entities. The types of entities, activities, and locations provided by the server device 38 may be dependent upon a variety of factors, including distance limits between the entity and the point location. According to some implementations, the server 38 provides all relevant activity information to the mobile computing device 10 at one time, e.g., in a single data packet or a single sequence of data packets. In another implementation, the server 38 provides activity information in response to the user selecting particular categories based on the initially received location-based information. More specifically, the server 38 first may provide location-based information that indicates which activities are generally available in one or several geographic areas proximate to the point location, but does not provide information that identifies specific entities associated with these activities in the geographic area. In response to the user selecting one of the geographic areas at the mobile device 10, the server 38 provides activity information that specifically identifies entities in the selected areas. As yet another alternative, the server 38 may provide sub-category information (e.g., "five cheap restaurants," "three expensive restaurants") in response to the user selecting a geographic area, and provides entity-specific information only in response to the user selecting one of the sub-categories.

Figure 3A:
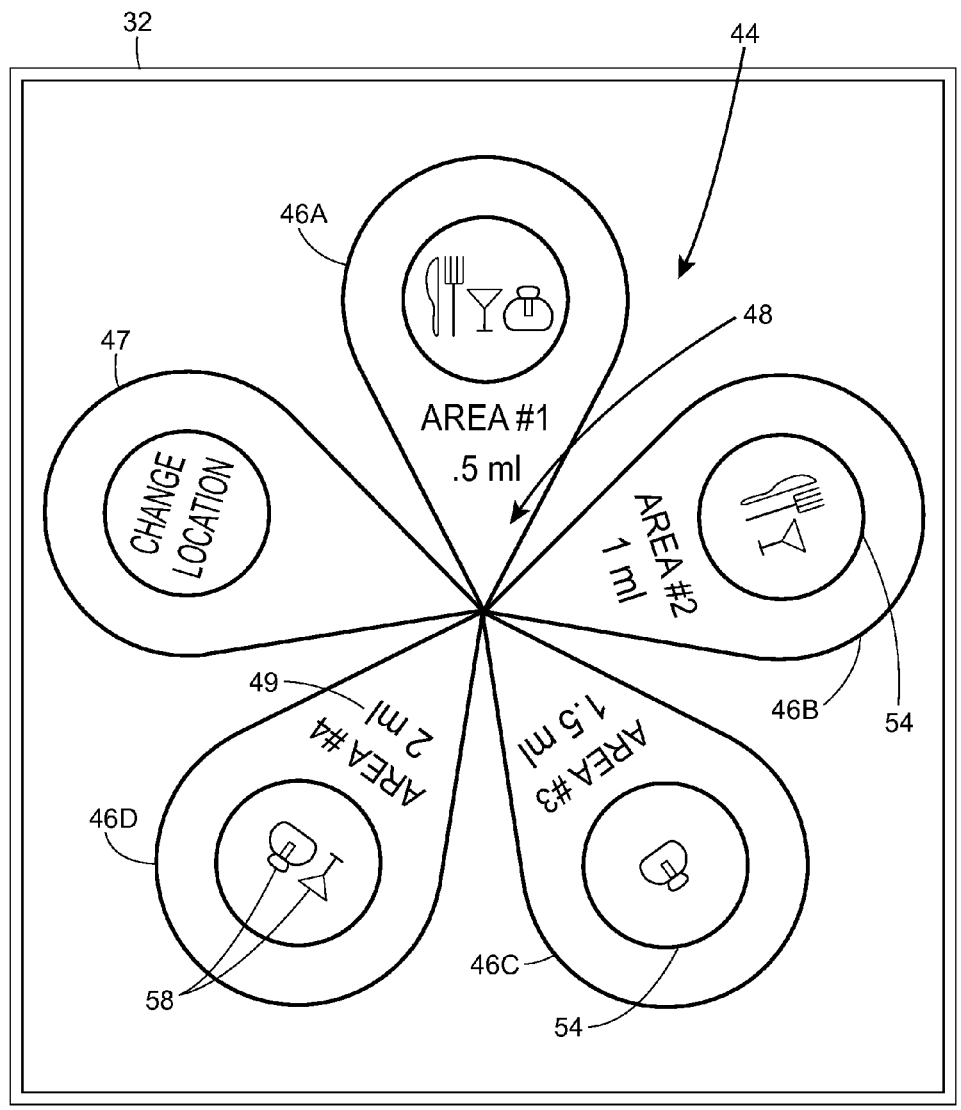
FIGS. 3A-3C illustrate several example screenshots depicting a radial list of areas, displayed in plan view.
Figure 3B:
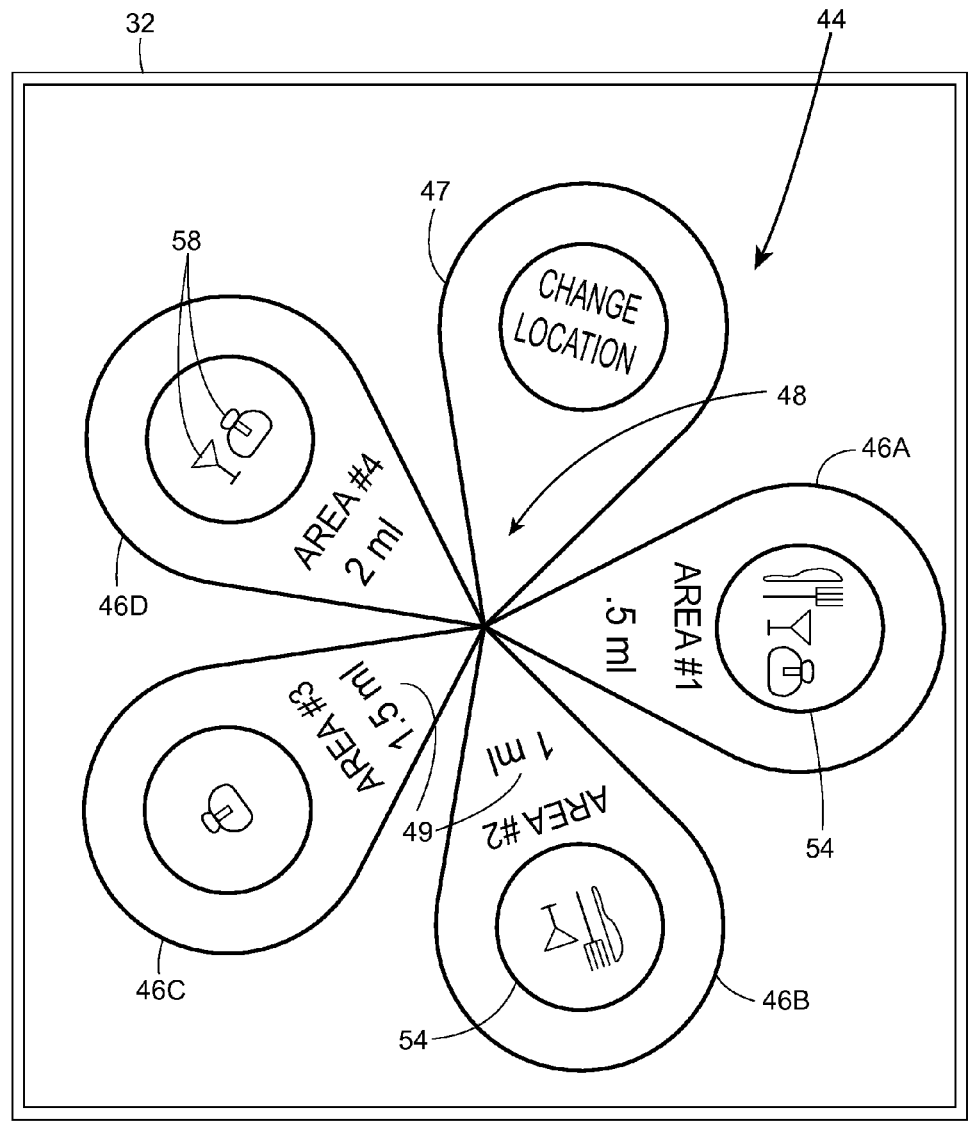
Figure 3C:
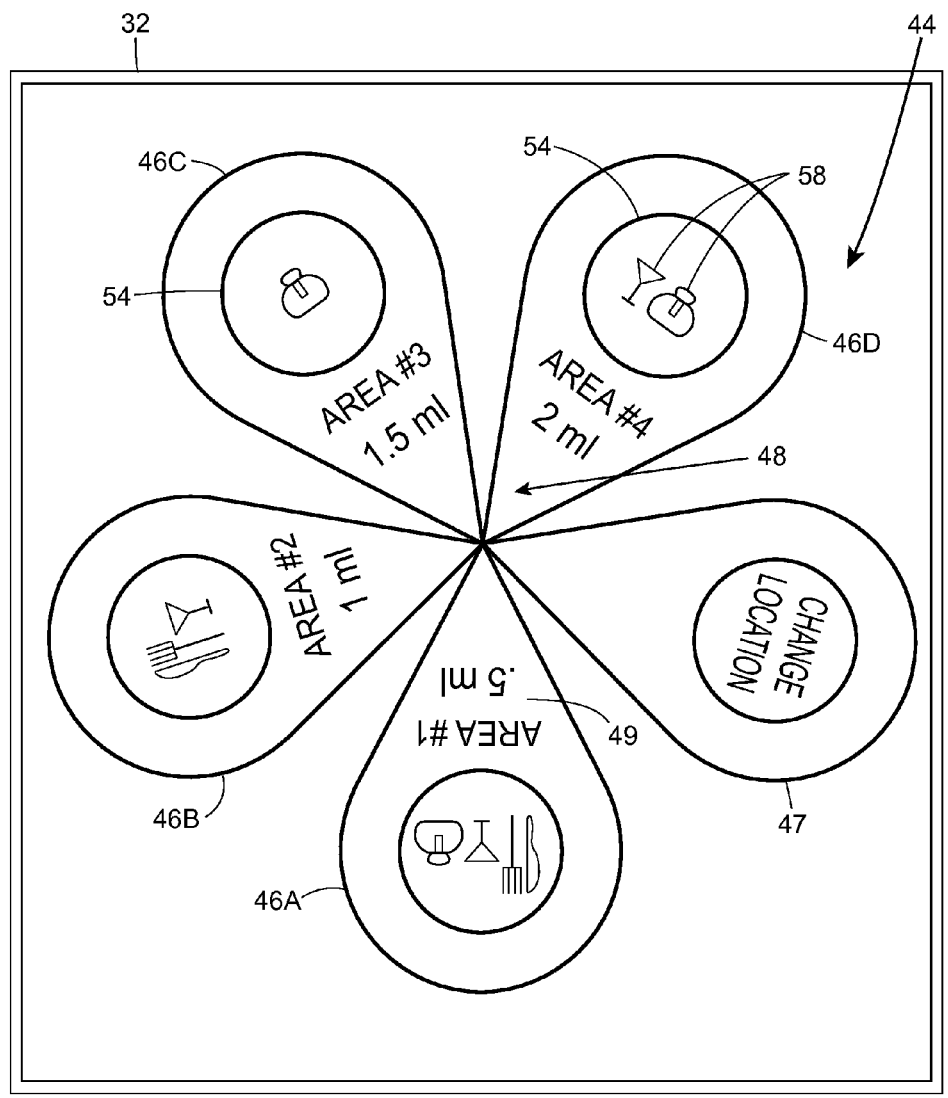

An illustration of location-based information provided to the portable device 10 in accordance with one example implementation of the method is shown in FIGS. 3A-3C as a radial list 44 of items 46. Each item 46 represents a specific geographic area associated with the point location. One or more entities providing a desired activity is physically located within each of the geographic areas represented by the items 46A, 46B, 46C, and 46D. Each representative item 46A, 46B, 46C, and 46D in the first radial list 44 may include a visible boundary to be at least partially enclosed within a delineating shape. The size and shape of the demarcation may be of any desired dimension and type, such as a petal, panel, plate, blade, balloon, plank, board, stave, slat, etc. By way of example only, the items 46A-46D are shown in FIGS. 3A-3C in a bulb-like form.

Additional information related to each geographic area, such the types of activities available or provided by entities located within the geographic area, may be represented by an activity indicator 54. The activity indicator 54 may be presented on the display screen 32 within the related item 46 of the radial list 44 and include an image or icon 58 depicting the type of activity. Some example icons 58 for activities may include a purse or bag for shopping, a set of cooking or eating utensils for dining, or a cocktail glass for night life. Of course, other activities may exist within a geographic area and be depicted by other representative icons 58 and more than one icon may be displayed within the activity indicator 54 and associated item 46 in the radial list 44. The display of the icon 58 representative of a particular activity within a particular selectable item may be dependent upon the amount of entities located within the associated geographic area providing the particular activity exceeding a threshold value, e.g., one entity, five entities.

In some respects, the radial list 44 operates as a location picker where several geographic areas are represented by the items 46 positioned about, and appearing to emanate from, a hub 48. The hub 48 may represent the point location that was determined or acquired by the positioning module 28, and the placement of the items 46 on the display screen 32 about the hub 48 generally references the geographic proximity of the geographic areas to the point location, e.g., the geographic areas nearest the point location. In one example of the radial list 44, the directional relationship of the location of each geographic area with respect to the point location may be represented on the display screen by the positional relationship of the respective items 46 about the hub 48. That is, the four sides of the display screen 32 may coincide with the four main directions of a compass, e.g., N, E, S, and W, and the positioning of a particular item 46 about the hub 48 on the display screen 32 may visually reflect the directional position of the geographic area in relation to the point location. In addition, each item 46 in the first radial list 44 may also include a distance indicator 49 indicating the approximate distance between the point location and the geographic area represented by the item 46. More specifically, the distance may be measured between the point location and a centroid geographic area, the nearest point within the geographic area, etc.

As indicated above, the items 46 of the radial list 44 displayed on the display screen 32 are individually selectable. The selection technique is primarily dependent upon the type of user interface 30 implemented by the mobile computing device 10. If the display screen 32 is responsive to touch, tapping or pressing the display screen 32 with a finger or stylus in accordance with most commonly used techniques may be acceptable. For example, touching a section on the display screen 32 proximate the desired selectable item 46 in the radial list 44 will select the selectable item 46. In implementations where the display screen 32 is not touch-sensitive, the user interface module 36 and the user interface 30, e.g., track-ball, track-pad, etc., may facilitate advancement through the selectable items 46 on the display screen 32, whereupon the desired selectable item 46 may eventually be highlighted for selection and/or activation.

Figure 4A:
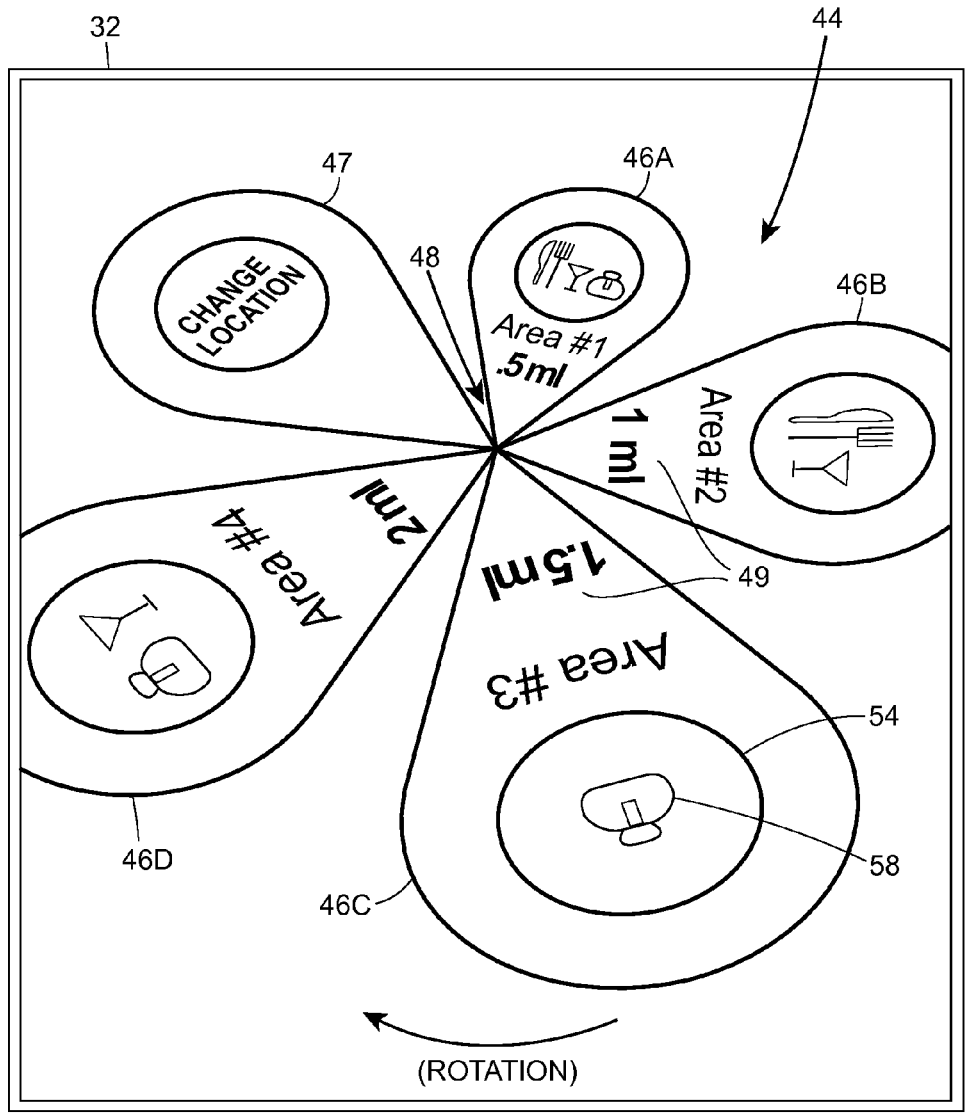
FIGS. 4A-4C illustrate an example sequence of screenshots that depicts clockwise rotation of an animated radial list of areas, displayed in perspective view.
Figure 4B:
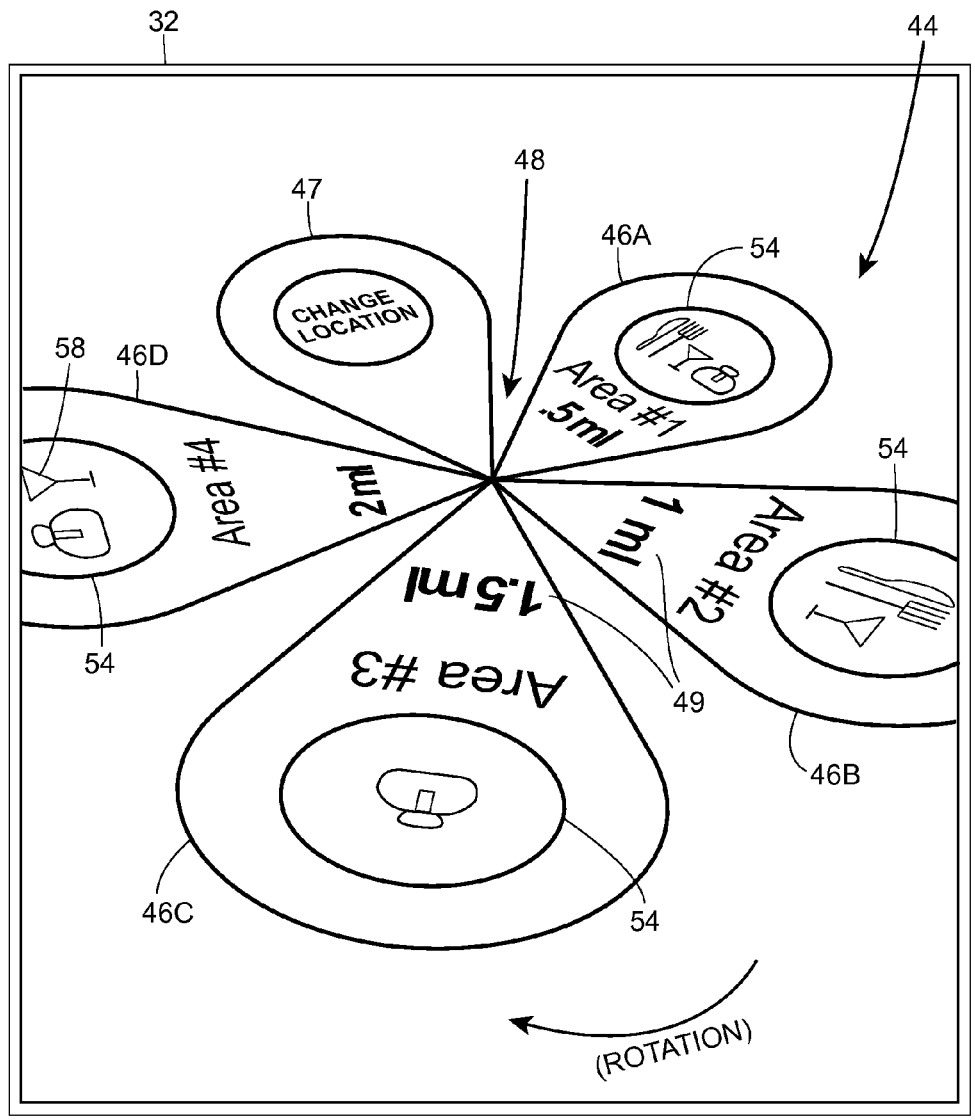
Figure 4C:
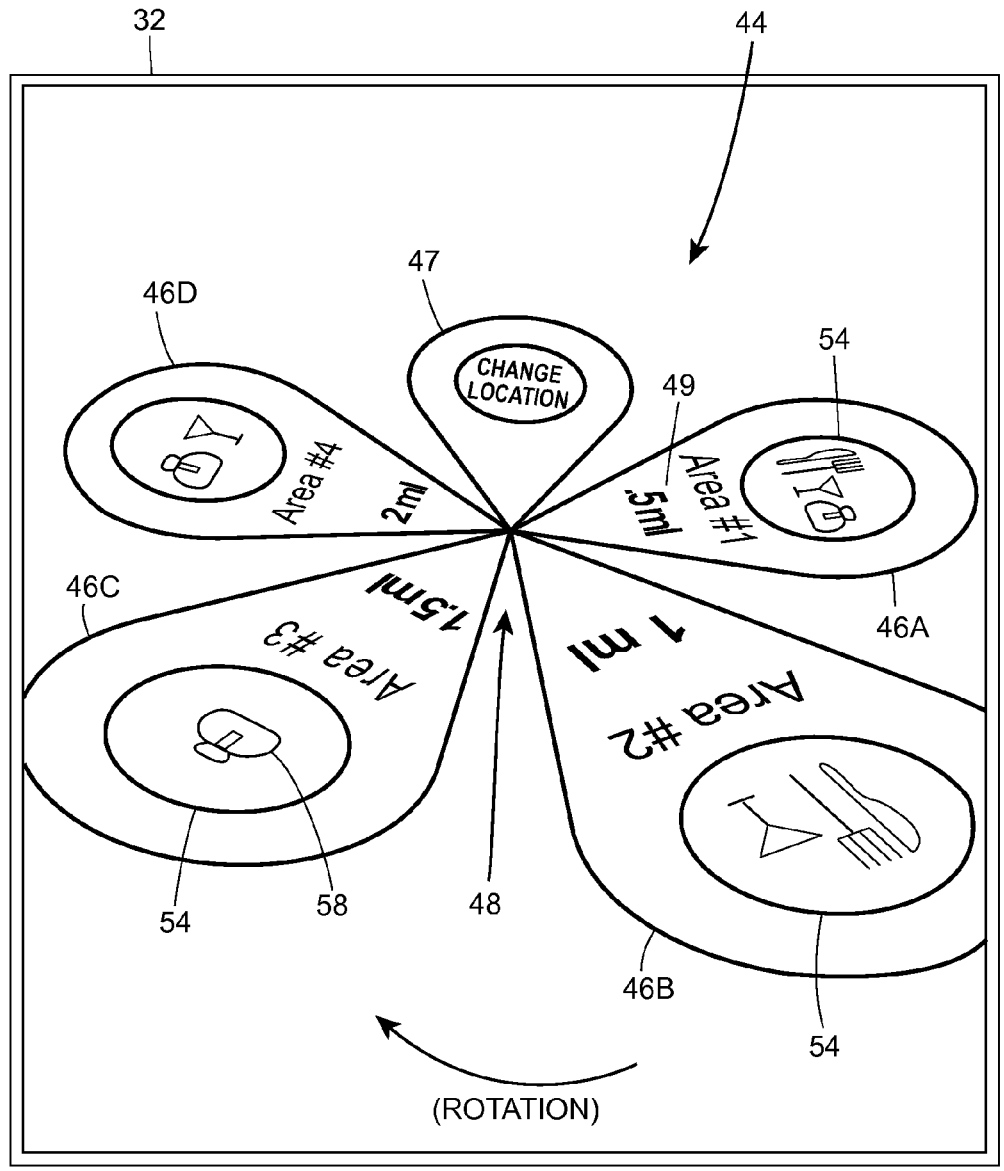

Although the radial list 44 is displayed in a plan or top view in FIGS. 3A-3C, it is to be understood that other displays, e.g., a perspective display as depicted in FIGS. 4A-4C, may also be presented. In addition, another item 47 that may be included in the first radial list 44 is a navigation aid that facilitates the changing of the point location upon which the server device 38 may rely to compile the location-based information. One implementation of the navigational aid is depicted as the selectable item 47 and includes a "Change Location" designation. Selection and/or activation of the Change Location item 47 will initiate steps on the portable device 10 to acquire a different point location to be utilized by the server device 38 in the compilation of location-based information, e.g., entities and activities categorized among one or more geographic areas near the point location.

Figure 5A:
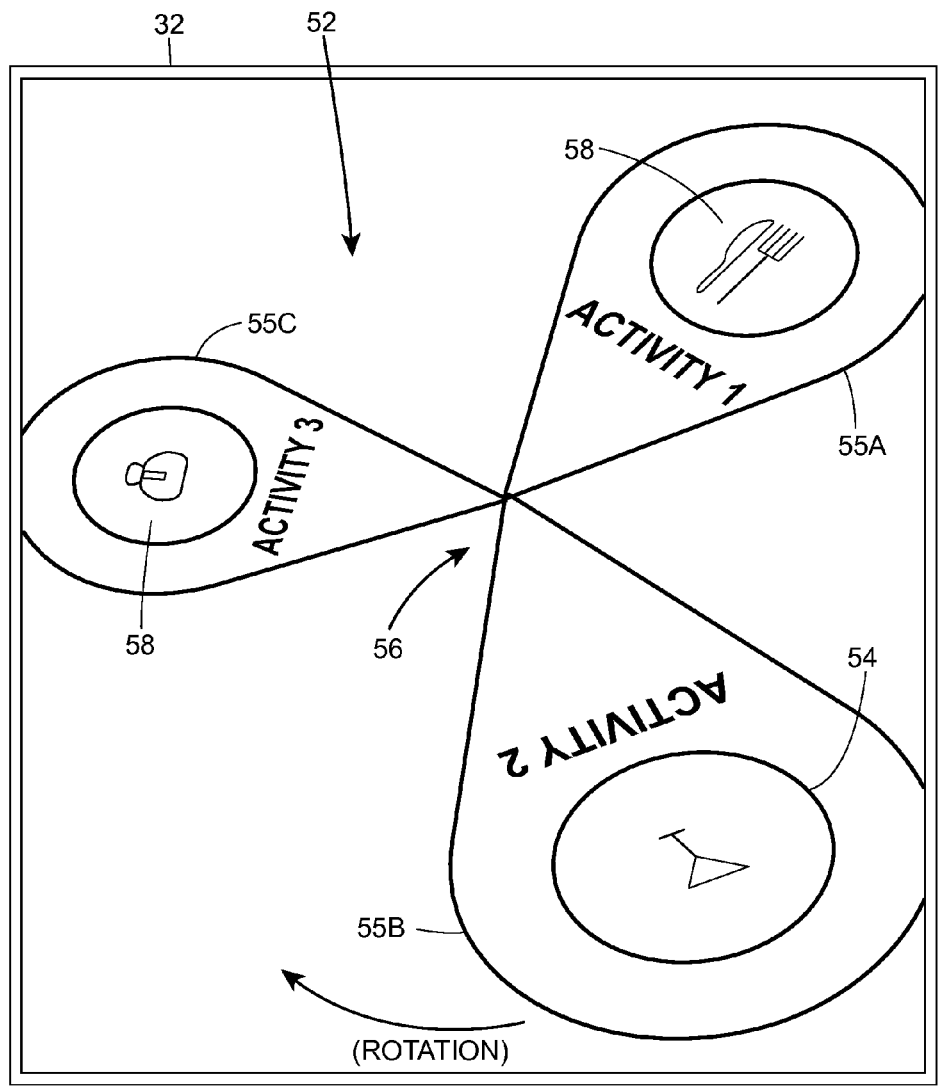
FIGS. 5A-5C illustrate an example sequence of screenshots that depicts clockwise rotation of an animated radial list of activities, displayed in perspective view.
Figure 5B:
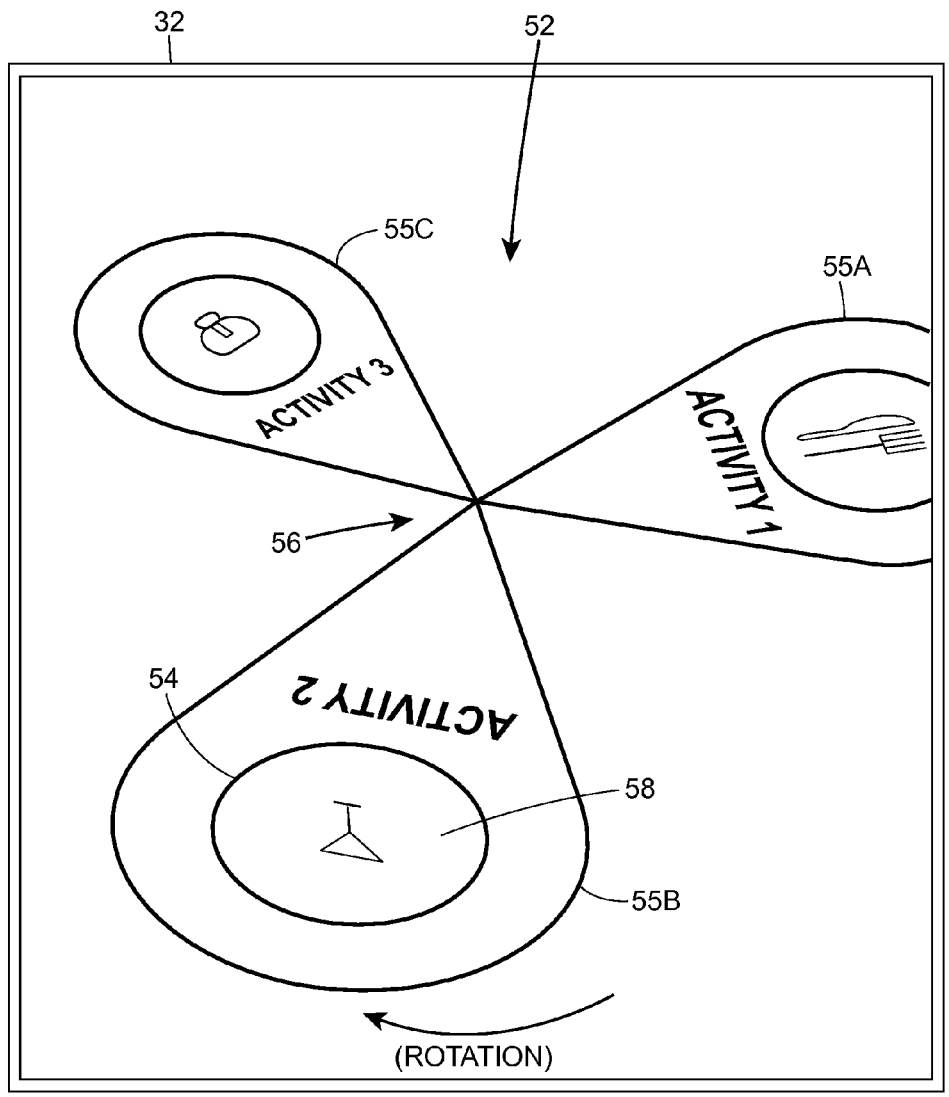
Figure 5C:
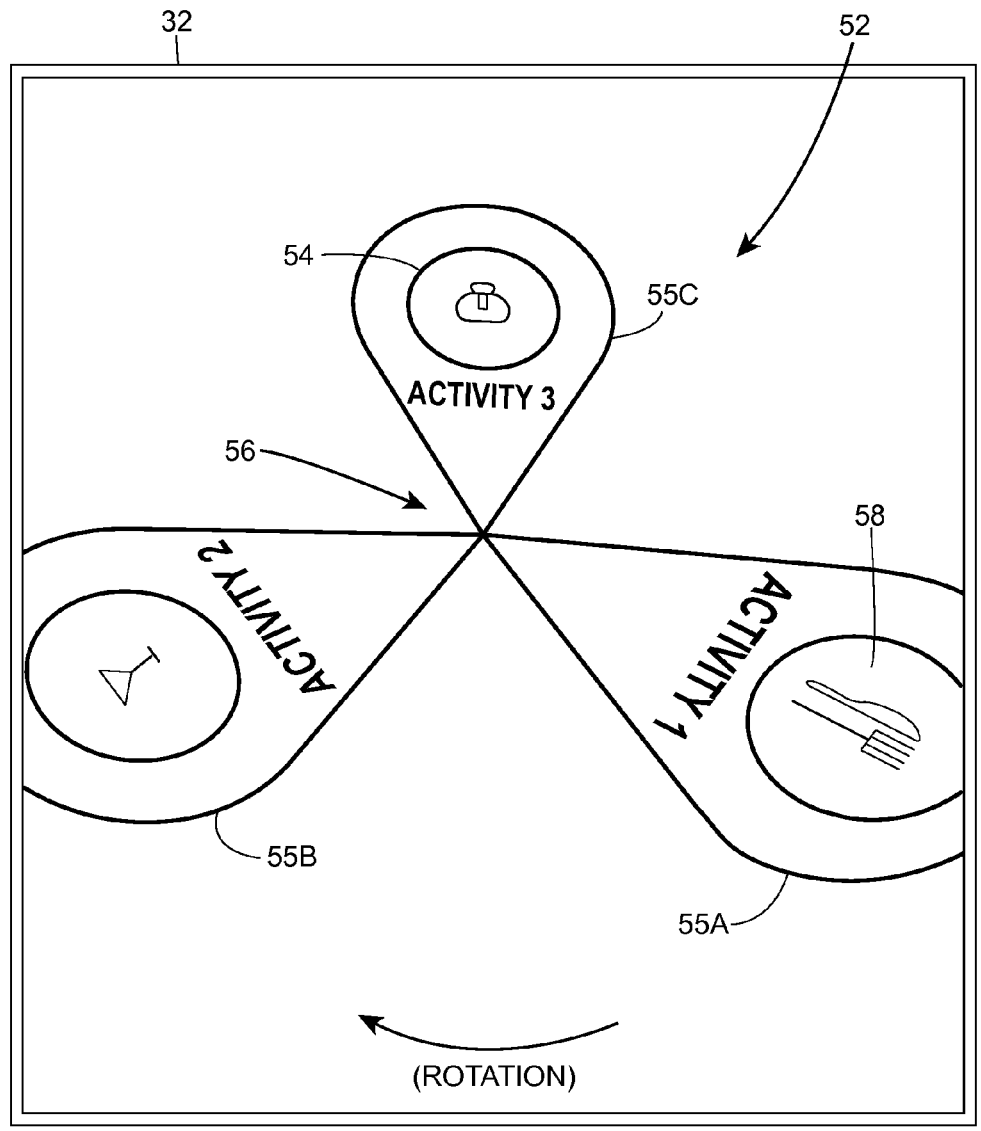
Figure 6:
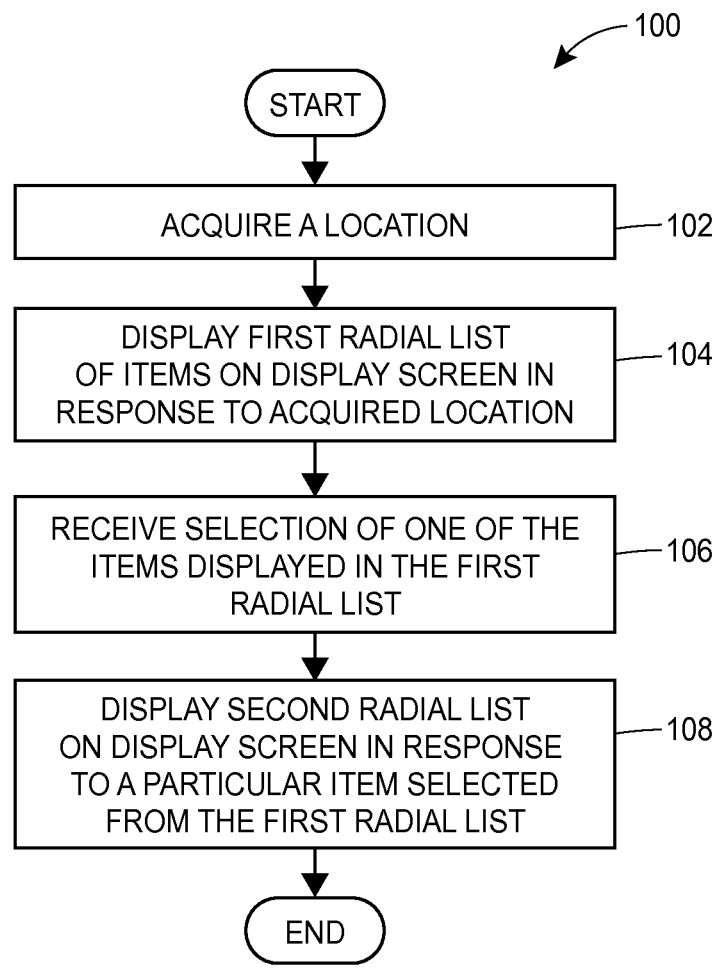
FIG. 6 is a flow diagram of an example method for displaying a menu including two radial lists.

In response to a particular selectable item 46 being selected from the first radial list 44, the portable device 10 identifies the associated geographic area represented by the selected item 46 and displays a subcategory of information on the display screen 32 of the mobile computing device 10. The subcategory of information may pertain to activities provided by one or more entities located within the geographic area associated with the selected selectable item 46. Referring to FIGS. 5A-5C, the selected subcategory of information may be presented as a radial list 52 of sub-items 55 on the display screen 32. This second radial list 52 in turn includes selectable sub-items 55, and each selectable sub-item 55 represents an activity available at the particular geographic area represented by the selectable item 46 previously selected from the first radial list 44. In other words, the sub-items 55 in the second radial list 52 indicate availability of more specific information regarding the activity and/or entity sought in respect to the particular geographic area and associated point location. As such, the sub-items 55 may be considered to be subdivisions of the items 46, where each sub-item 55 represents a common differentiating characteristic, i.e., activity, within the larger category of items 46, e.g., geographic areas. In addition to the primary categorizations relating to geographic area and activity types, other divisions may be established by user preferences and/or configuration of the corresponding application.

The method therefore may implement a second picker application, e.g., an activity picker, where at least a portion of the second radial list 52 of selectable sub-items 55 is displayed on the display screen 32 in response to receiving a selection of a particular selectable item 46 from the first radial list 44 of items. For example, in FIGS. 4A-4C and 5A-5C, the selectable items 46 listed in the first radial list 44 represent several geographic areas. The selection of one of the selectable items 46 will elicit more specific information related to the associated geographic area to be displayed on the display screen 32. In particular, the second radial list 52 of sub-items 55 representing activities, e.g., dining, shopping, night life, available within the corresponding geographic area will be displayed on the portable device 10. Each selectable sub-item 55 may include an activity indicator 54 and a representative activity icon 58 as shown in FIGS. 5A-5C. Upon selection of a selectable sub-item 55 depicted in the second radial list 52, additional, more specific, information may be displayed on the display screen 32 until eventually an article, e.g., entity or establishment, for engaging in the desired activity is determined.

Similar to the first radial list 44, one of the selectable sub-items 55 depicted within the second radial list 52 may be a navigational aid, e.g., Change Location (not shown in FIGS. 5A-5C). Upon selecting the selectable sub-item designated with a Change Location indicator, the navigation module interface 42 may dismiss the display of the second radial list 52 from the display screen 32 and redisplay the first radial list 44, or the process for selecting a different point location may be initiated. Alternatively, a hardware component, e.g., button, operatively attached to the mobile computing device 10 and having the same functionality as the Change Location item 47 and/or sub-item may be used in either radial list 44, 52 instead of the designated Change Location item 47 and/or sub-item.

In an alternate implementation, the display of the first and/or the second radial lists 44, 52 may be animated wherein the individually selectable item(s) 46 and/or sub-item(s) 55 within the respective radial list appears to revolve about the respective hub 48, 56. As shown in FIGS. 4A-4C and 5A-5C, the revolution of selectable items 46 or sub-items 55 about their respective hub 48, 56 may be in a clockwise or counterclockwise direction (and the respective hubs may appear visually or coordinately aligned between respective displays and/or animations of the radial lists presented on the display screen 32). In the implementation where each selectable item 46 or sub-item 55 is delineated by a shape, the size of the shape may change, e.g., increase or decrease, randomly or at prescribed times or locations within the orbit. For example, as each selectable item 46 or sub-item 55 appears to approach the bottom portion of the display screen 32, the size of the shape may be enlarged for better viewing. Additionally, the shape associated with the selectable items 46 and sub-items 55 within their respective radial list 44, 52 may be the same size, or the sizes between selectable items 46 and sub-items 55 within their respective radial list 44, 52 may vary. The size variation between selectable items 46 and/or sub-items 55 may be representative of a characteristic, such as an amount of activities associated with each geographic area or the distance from the point location to the geographic area. The type or color of shape associated with the selectable item 46 and/or sub-item 55 may also change during the orbit, for example, from a bulb to a plank.

Regardless of whether the shapes associated with the selectable items 46 and sub-items 55 are of equal or different size, shape, or color, all the selectable items and sub-items may fit entirely within the display screen 32 or a portion or portions of the selectable items or sub-items may temporarily extend beyond the border of the display screen 32 and not be viewable until the selectable item 46 or sub-item 55 continues revolving about the respective hub 48, 56. As shown in FIGS. 4A-4C and 5A-5C, the shape associated with some of the selectable items 46 or sub-items 55 appears to extend beyond the border or boundary of the display screen 32, which may produce a visual effect that at least a portion of the shape associated with the item 46 or sub-item 55 appears to leave the display screen 32 and return to the display screen.

Scrolling and text movement may often had been necessary when employing dialog boxes or picker applications because not all of the list contents may have fit within the viewable portion the screen, and the list contents would remain off-screen until the user interacted to move the contents of the list into view. However, through the use of graphics and animation, the first 44 and second 52 radial lists displayed in FIGS. 4A-4C and FIGS. 5A-5C provide the entire portion of every selectable item 46 and sub-item 55 in a viewable form at some time on the display screen 32 with little or no user interaction. That is, the animated radial lists 44, 52 continually display the selectable items 46 and/or sub-items 55 without the need for user interaction with the user interface 30 to scroll or move the selectable items and/or sub-items about the display screen 32. In some implementations, the radial list 44, 52 remains static until the user communicates motion to the radial list, for example, through a swipe of a finger upon the display screen 32. In the example radial lists 44, 52 depicted in FIGS. 4A-4C and 5A-5C, the plurality of respective selectable items 46 and sub-items 55 are shown in a continuum of three discrete screenshots as revolving in a clockwise direction (as indicated by the directional arrow near the bottom of the display screen) about their respective hub 48, 56 so that the shape associated with each selectable item 46 and sub-item 55 appears to increase in size at it approaches the bottom of the display screen 32 and appears to decrease in size as it approaches the top of the display screen 32. The shape associated with the selectable item 46 or sub-item 55 nearest the bottom edge of the display screen 32 may be shown in its entirety within the display screen 32 in an attempt to draw more attention to the item/sub-item.

In implementations incorporating display screens 32 responsive to touch, the revolution of the radial list(s) may be modified, e.g., started, sped up, slowed down, stopped, and reversed. In addition, the size and shape associated with each selectable item 46 and/or sub-item 55 provides a larger surface area for integration and interaction with the user interface 30, user interface module 36, and/or navigation module interface 42 as compared to many existing picker applications and dialog boxes. The larger surface area of the shape facilitates selection of the selectable item 46 and/or sub-item 55 as compared to the functionally similar areas implemented in picker applications and dialog boxes that are typically constrained by the font size of the text being utilized.

Referring now to FIG. 6 and again to FIGS. 2, 4A-4C, and 5A-5C, one implementation of an example method 100 for use in a portable device 10 having an operating system 20 and a display screen 32 includes acquiring a point location at a block 102. The computing device 10 requests location-based information associated with the point location from a server device 38. The point location may be acquired by the positioning module 28 utilizing a location positioning technology, e.g., GPS, or the point location may have been received at the computing device 10, e.g., entry of a city name or ZIP code through the user interface 30. The computing device 10 receives location-based information associated with the point location. At least one processor 14 of the computing device 10 operatively cooperates with the graphics processing unit 16 and the navigation module interface 42 at a block 104 to display the first radial list 44 of items 46 on the display screen 32. A selection of one of the selectable items 46 displayed on the first radial list 44 is received by navigation module interface 42 and user interface 30 at a block 106. The graphics processing unit 16 and the navigation module interface 42 operatively cooperate at a block 108 to display at least a portion of the radial list 52 of sub-items 55 on the display screen 32 in response to the particular item 46 selected from the radial list 44 of items 46.

Figure 7:
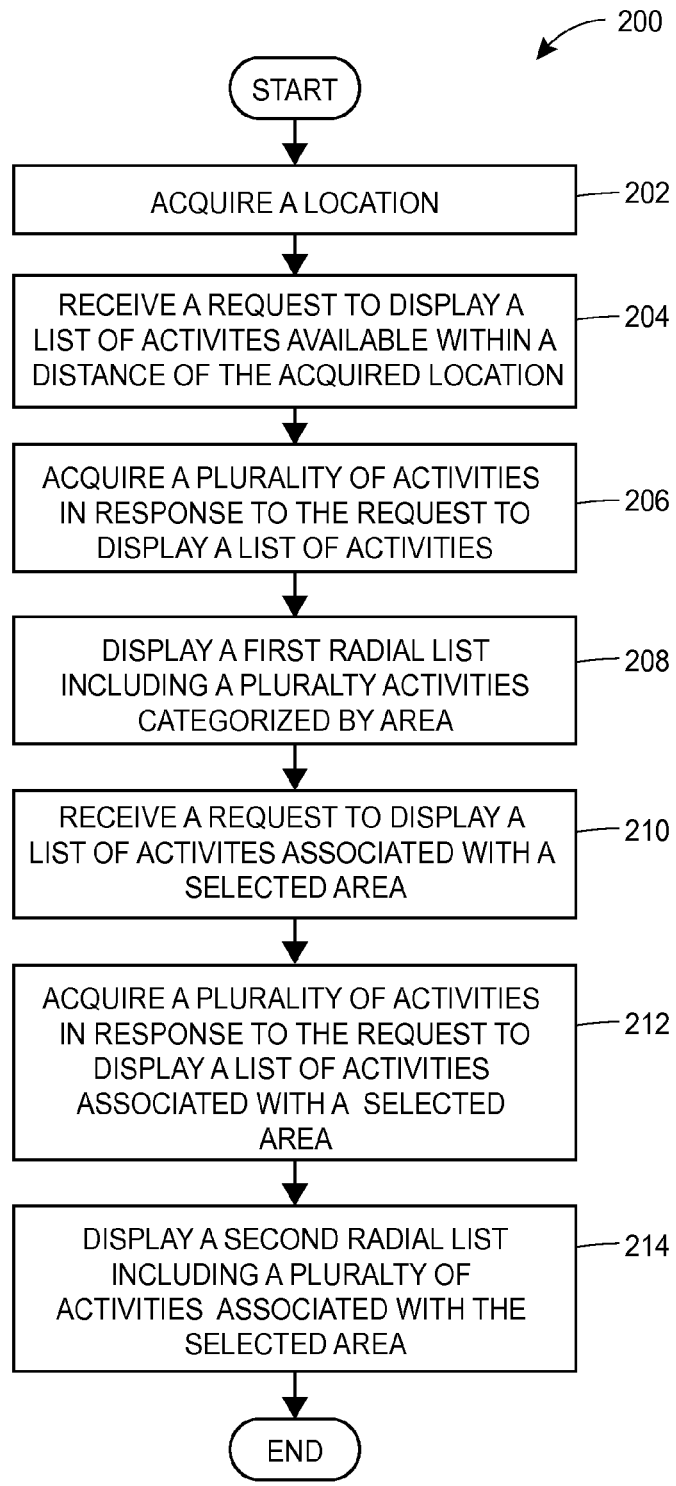
FIG. 7 is a flow diagram of an example method for displaying a radial list associated with a neighborhood picker application.

Another implementation of a method 200 for use in a portable device 10 having an operating system 20 and a display screen 32 is shown in FIG. 7 with further reference to FIGS. 2, 4A, and 5A where the point location is acquired at block 202. The point location may be acquired by the positioning module 28 utilizing a location positioning technology, e.g., GPS, or the point location may have been acquired at the computing device 10 via entry of a city name or ZIP code through the user interface 30. A request is received by the user interface 30 of the portable device 10 at a block 204 to display a list of activities available within a distance of the acquired point location. At a block 206, location-based information is acquired at the portable device 10 in response to the request to display a list of activities available near the point location. The GPU 16 and the navigation module interface 42 cooperate at a block 208 to display at least a portion of a first radial list 44 on the display screen 32. The first radial list 44 shown in FIG. 4A includes a compilation of the acquired location-based information, in particular, activities located in geographic areas near the point location. Each geographic area is exclusively associated with one item 46, e.g., bulb, of the first set of items depicted in the first radial list 44 on the display screen 32. Upon selection of one of the items 46, a request to display a list of activities available within the geographic area associated with the selected item 42 is received by the navigation module interface 42 at a block 210. Activity information is acquired by the portable device 10 at a block 212. The GPU 16 and the navigation module interface 42 operatively cooperate at a block 214 to display at least a portion of the radial list 52 of sub-items 55 on the display screen 32. An example of the second radial list 52 is shown in FIG. 5A and includes a compilation of the available activities. Each activity of the plurality of activities is associated with and represented by one sub-item 55 of the radial list 52, which is associated with the geographic area that corresponds to the selected item 46.

Another subcategory of location-based information that may be presented on the display screen 32 in response to the selection of a selectable item 46 in the first radial list 44, or in response to the selection of a selectable sub-item 55 in the second radial list 52, is a further categorization of the activity information that was received from the server device 38. This information may be displayed in a window-like appearance on the display screen 32 as shown in FIGS. 8A-8D and 9A-9C. The location-based information provided to the mobile computing device 10 may be displayed amongst a plurality of windows on the display screen 32 in such a manner as to present a visual effect of a stack of layered windows. The layered stack of windows is aesthetically arranged to provide positional awareness within the stack of windows while traversing the information displayed on the display screen 32. Each window of the plurality of windows of compiled information is categorically interconnected or linked to the previous and/or subsequent window of displayed information. The interconnection between the plurality of windows of information may be topically and/or geographically associated in a hierarchical context such as in a category, subcategory, and sub-subcategory relationship.

Each window of the plurality of windows displayed on the mobile computing device 10 and shown on the display screen 32 includes a header segment 60 and a content segment 62. A portion of the header segment 60 of each window of the plurality of windows displayed on the display screen 32 is visible on the display screen to contribute to the visual effect of the stack of layered windows. If desired, a portion of the header segment 60 of any combination of underlying windows within the stack of layered windows displayed on the display screen 32 may be displayed in a semi-transparent, faded-out, and/or resized form, in comparison to the header segment 60 associated with the uppermost displayed window appearing on the display screen 32.

Various example formats of header segments displayed in a few example configurations of the layered stack of windows displayed on the display screen 32 are illustrated in FIGS. 8A-8D and 9A-9C. In response to the selection of one of the selectable sub-items 55 in the second radial list 52, the navigation module interface 42 displays a first window 64 of information on the display screen 32 of the mobile computing device 10 that may have an appearance similar to that shown in FIGS. 8A and 9A. The first window 64 of information includes a header segment 60 that may display an area indicator 50 identifying the geographic area associated with the information being displayed on the window 64, as well as an activity type indicator 51 identifying the type of activity associated with the information being displayed on the window 64. Information pertaining to the various groupings or categories related to the activity can be contained within the content segment 62 of the first window 64.

To better illustrate the relationship between windows, the header segments 60 and content segments 62 in FIGS. 8A-8C and 9A-9C display generic designations, such as "area," "activity," "category," and "entity." However, it will be understood that the navigation module interface 42 displays names or designations of actual geographic areas, activities, and entities. Further, it is noted that the names or designations need not be text-based and may be pictorial, for example.

Figure 8A:
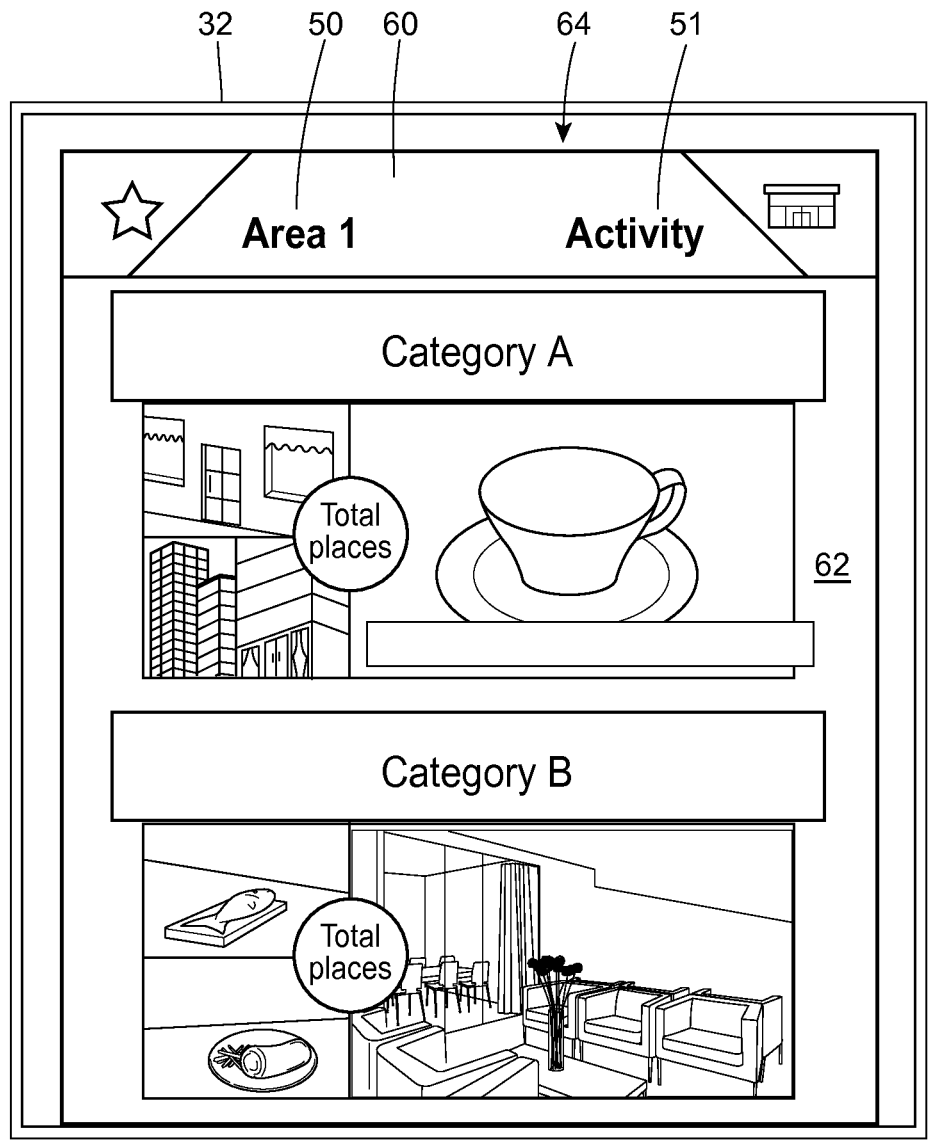
FIGS. 8A-8C are diagrams of an example set of windows in which information is displayed on a display screen of a mobile computing device in accordance with the techniques of the present disclosure.

With continued reference to FIG. 8A, if dining is the activity type associated with the sub-item 55 selected from the radial list 52 of sub-items 55, any subcategories or groups of dining (e.g., restaurants, fast food places, coffee shops) may be listed within the content segment 62 of the first window 64 of information. The one or more groups of dining are displayed in the first window 64 on the display screen 32. The header segment 60 of the first displayed window 64 includes the area indicator 50 identifying the particular area, e.g., Area 1, where entities capable of providing the activity, e.g., dining, exist. The various groups of dining are displayed within the content segment 62 of the first displayed window 64 and a header, e.g., Category A, Category B, etc., may be used to differentiate between the different subcategories of dining, e.g., fine dining, fast-food, coffee shop. If the subcategory information exceeds the boundary of the content segment 62 of the window, the information contained within the content segment may be scrolled through via utilization of the navigation module interface 42. At all times however, the header segment 60 of the first display window 64 remains essentially affixed proximate to an edge of the display screen 32.

The uppermost displayed window of information may be removed from the display screen 32 by invoking the navigation module interface 42. In one implementation, the navigation module interface may be invoked by tapping the header segment 60 with a finger or stylus, or a button, e.g., back-button, operatively affixed to the user interface 30 may be actuated. Upon removal of the first displayed window 64, the first 44 or second 52 radial list may be re-displayed, according to one example implementation.

Further in this example, selection of any of the subcategories or groups of dining activity may invoke the navigation module interface 42 to display a list of entities, e.g., proprietors, establishments, providing the type of activity selected from the first displayed window 64 on the display screen 32 within the content segment 62 of a second window 66. For example, if coffee shop is the selected subcategory, entities located with the geographic area and falling within the classification of coffee shop, will be listed by the navigation module 42 in the content section 62 of the second window 66.

Figure 8B:
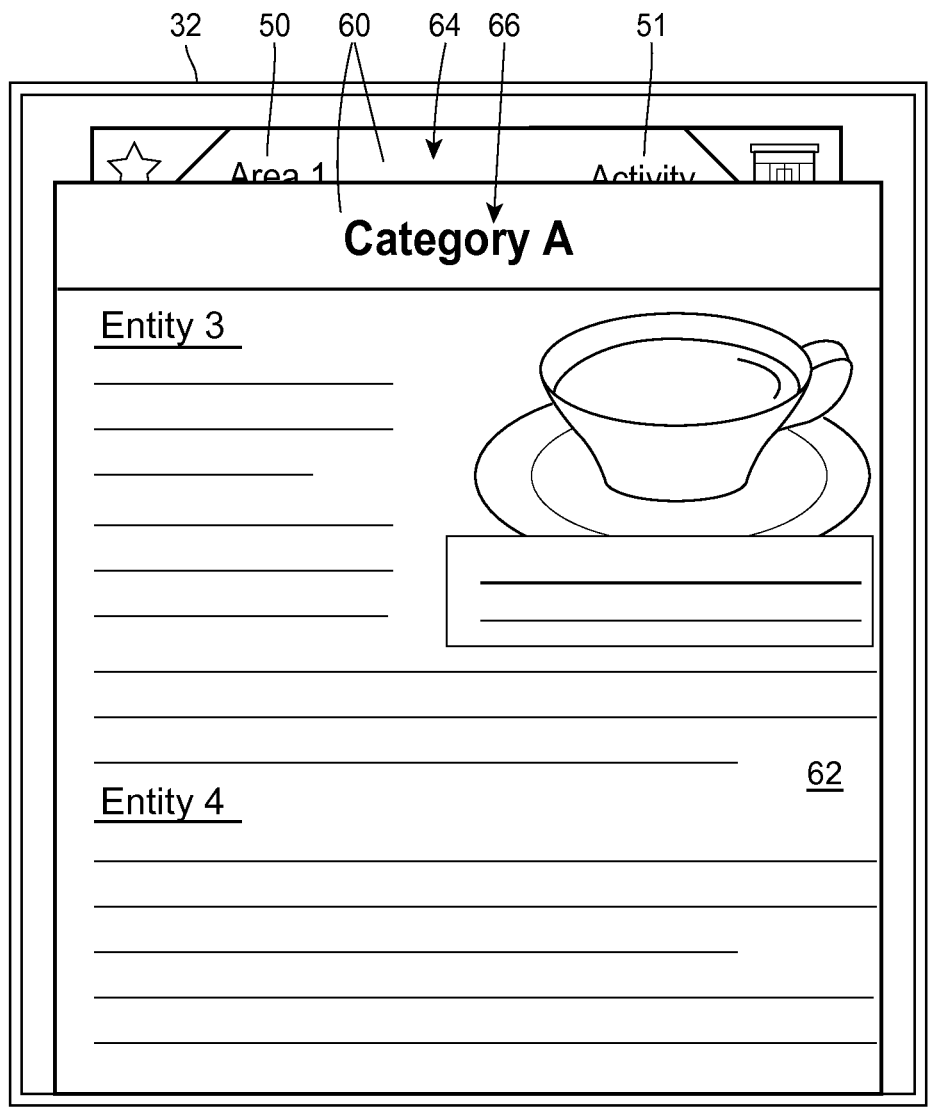

As shown in FIG. 8B, the second display window 66 is positioned atop the first display window 64, initially shown in FIG. 8A, and essentially occupies the entire width of the display screen 32. The content segment 62 of the first window 64 of information includes several categories, or groups of the activity, e.g., dining, however this information is now obscured by the display of the second window 66, although the header segment 60 (and its contents) of the first displayed window 64, are only partially obscured by the second displayed window 66. The content segment 62 of the second window 66 of information includes a list of subcategories, e.g., entities, where the selected activity is available. Information contained within the content segment 62 of the second window 66 is directed toward these entities and may include brief information about each listed entity. The header segment 60 of the second displayed window 66 is positioned proximate to the header segment 60 of the first displayed window 64, which remains positioned proximate to the upper edge of the display screen 32. The area of the header segment 60 of the first displayed window 64 however, may be reduced in comparison to the header segment 60 of the second displayed window 66. In particular, the width and height of the header segment 60 of the underlying window 64 shown in FIG. 8B is reduced in comparison to the header segment 60 of the uppermost displayed window 66 on the display screen 32. The appearance and size of the content information, e.g., text font, within the header segment 60 of the first display window 64 may similarly be reduced in proportion to the reduction in area of its header segment.

Figure 8C:
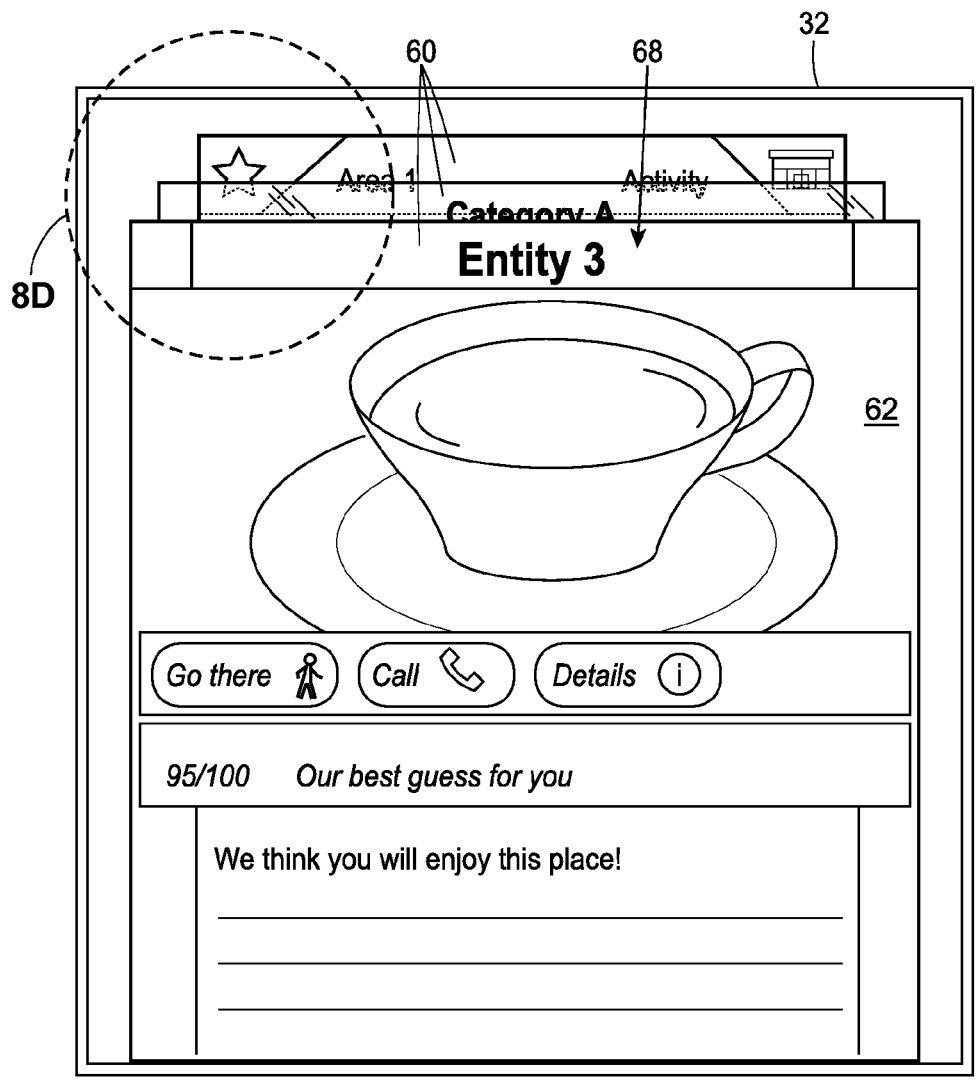
Figure 8D:
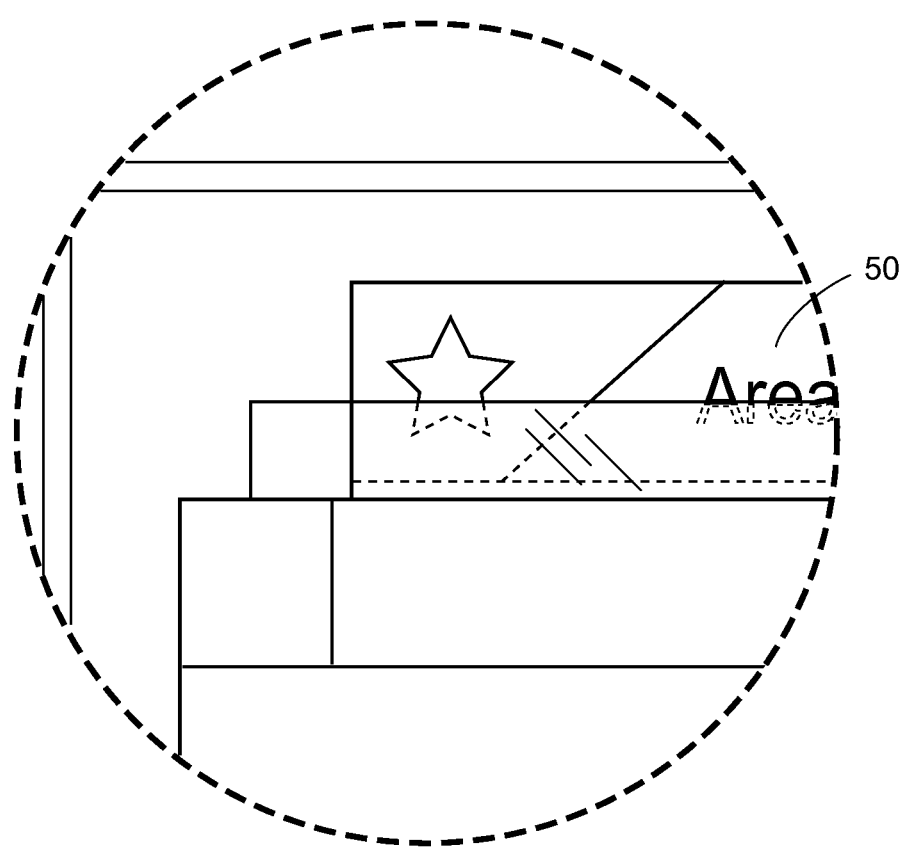
FIG. 8D illustrates an enlarged portion of the display screen of FIG. 8C.

In response to the selection of a sub-category, e.g., entity, displayed on the uppermost window 66 in FIG. 8B, a third display window 68 is displayed and positioned atop the second 66 and first 64 displayed windows initially shown in FIGS. 8A and 8B. As shown in FIG. 8C, the third display window 68 essentially occupies the entire width of the display screen 32 and obscures the content segments 60 of the first 64 and second 66 displayed windows. The content segment 62 of the third window 68 includes specific information pertaining to the particular sub-subcategory, e.g., entity, selected from the second window 66 shown in FIG. 8B. Information about the entity is displayed within the content segment 62 of the third window 68 and may include images, video content, hyperlinks, contact information, detailed commentary, ratings, etc. The header segment 60 of the third display window 68 is positioned proximate to the header segment 60 of the second display window 66, while the header segment 60 of the second display window 66 remains positioned proximate to header segment 60 of the first display window 64, which remains positioned proximate to the edge of the display screen 32.

Although the header segment 60 of the third display window 68 partially obscures the header segment 60 of the second display window 66, which in turn partially obscures the header segment 60 of the first display window 64, the header segment 60 of any combination of underlying windows may be displayed in a semi-transparent form. For example, in FIG. 8C, the header segment of the second display window 66 is displayed in a semi-transparent form and the contents of the header segment 60 of the first display window 64 are therefore visible and recognizable. Thus, as more particularly shown in FIG. 8D, content information within the header segment 60 of the first display window 64, such as the area indicator 50 and the activity type indicator 51, are viewable.

In one implementation, the uppermost window may be removed, and the underlying window brought to the foreground, by the navigation module interface 42 in response to detecting that the user tapped or otherwise selected a portion of the header segment or a back-button associated with the uppermost displayed window. The user can thus "pop" the uppermost displayed window off the stack of windows with a single tap of the header (or, if a keyboard is used, with the activation of a single keystroke, push-button, or mouse click).

Figure 9A:
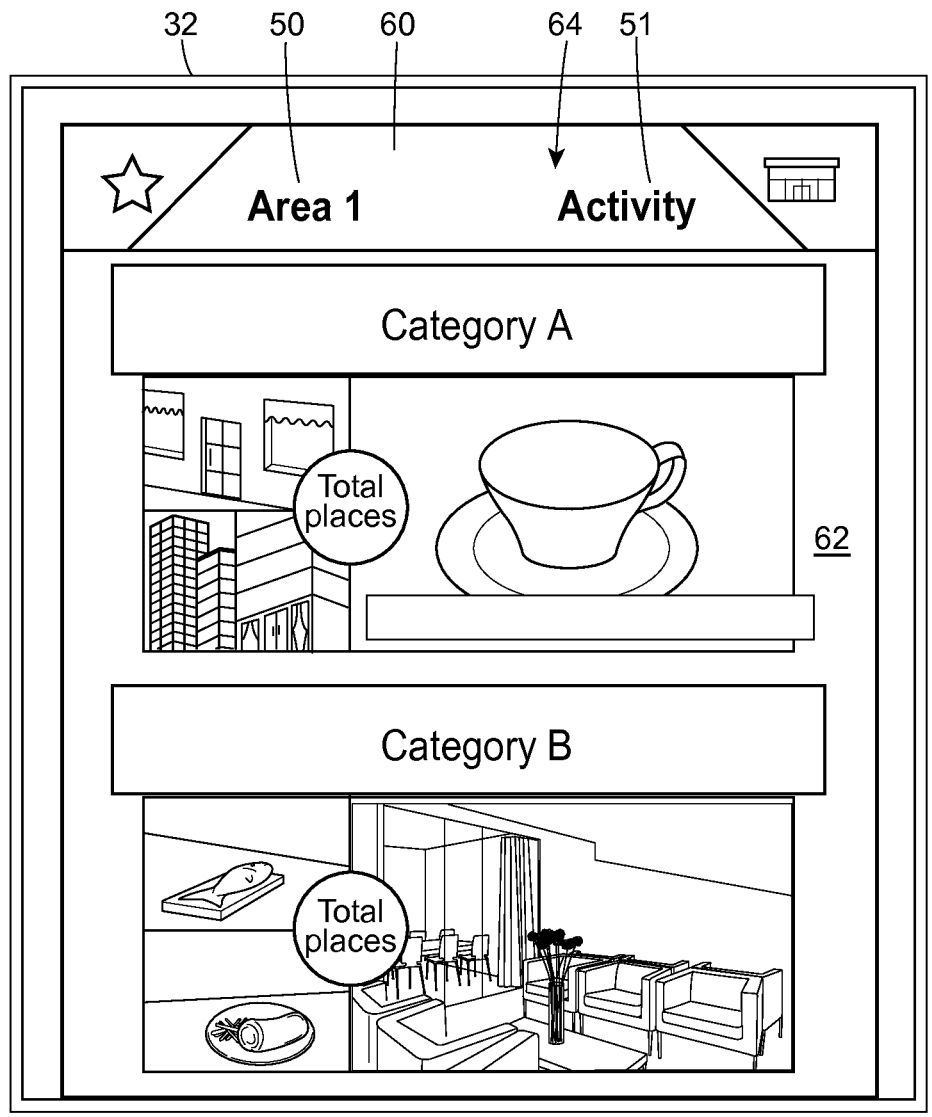
FIGS. 9A-9C are diagrams of another example set of windows in which information is displayed.
Figure 9B:
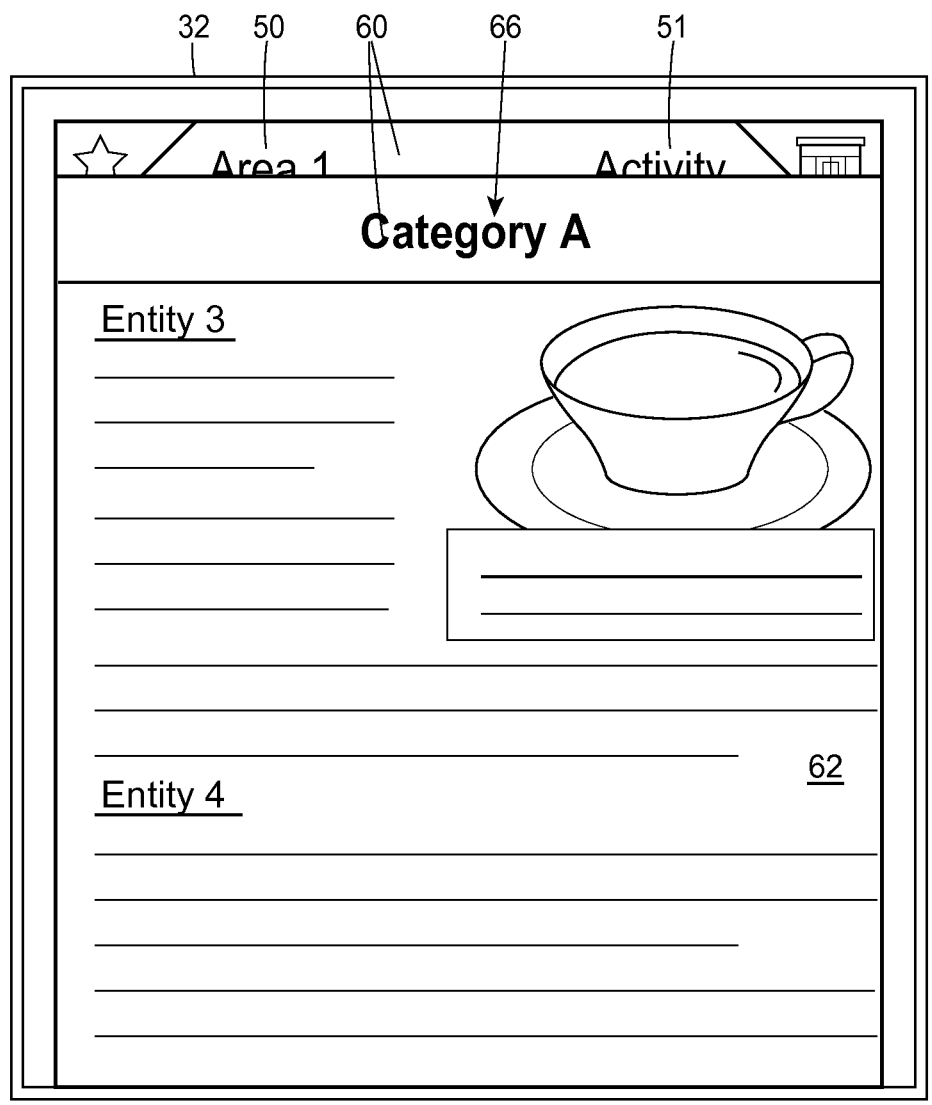
Figure 9C:
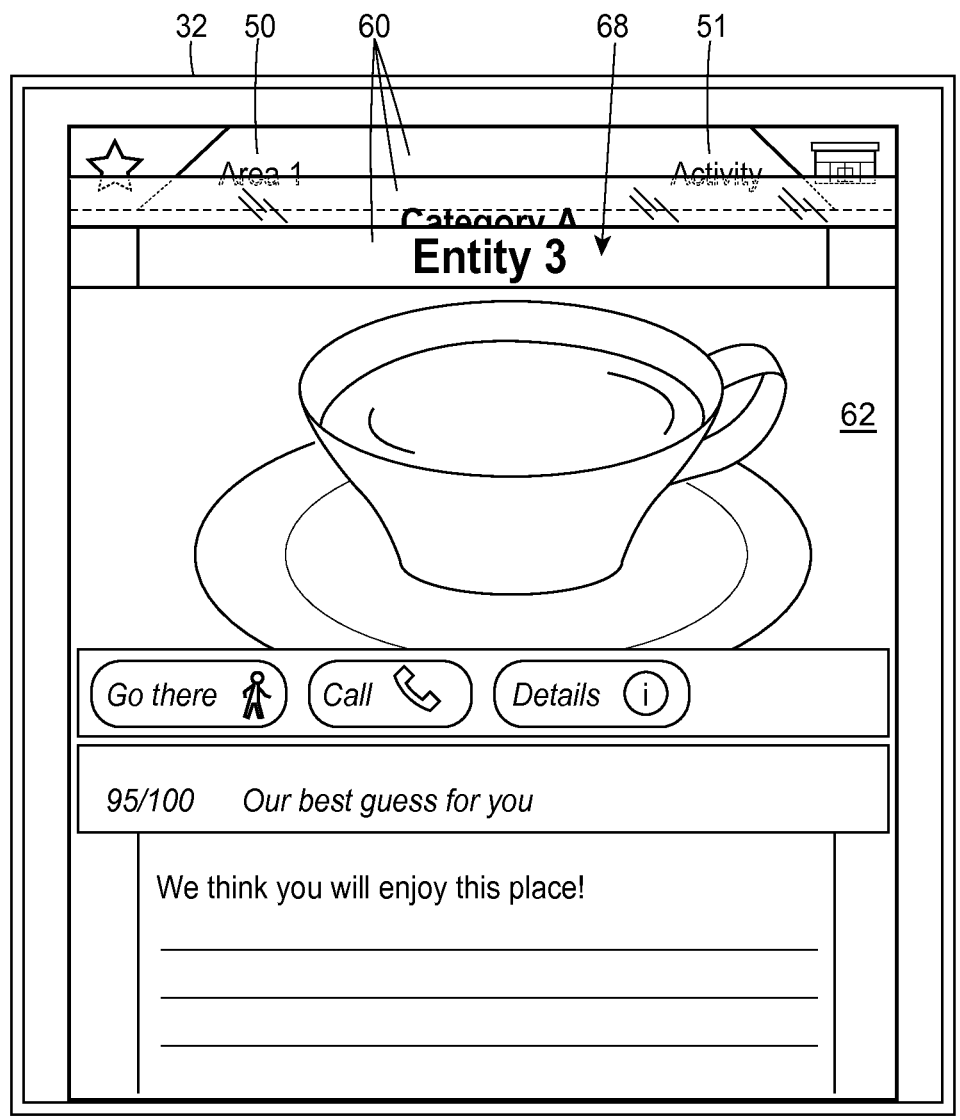
Figure 10:
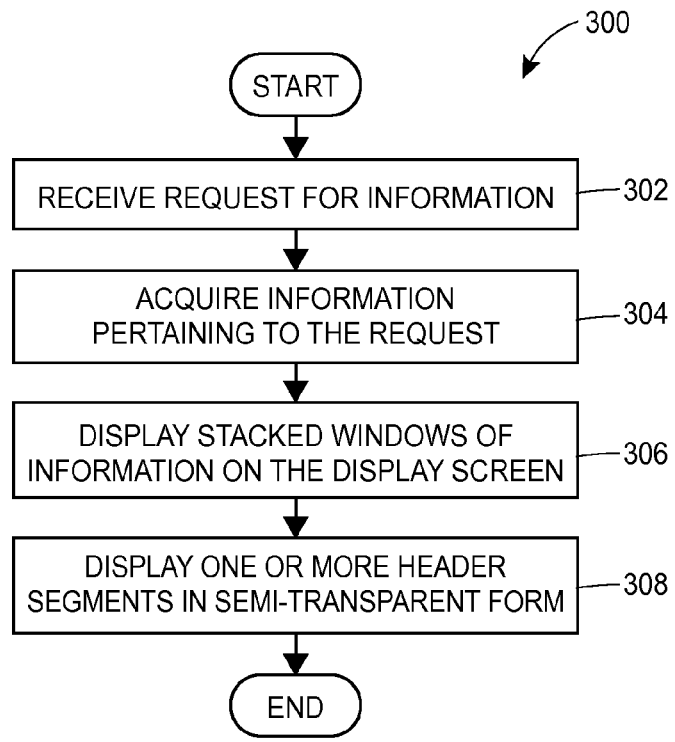
FIG. 10 is a flow diagram of an example method for displaying information within several windows on the display screen of a mobile computing device to present the visual effect of a hierarchical stack.
Figure 11:
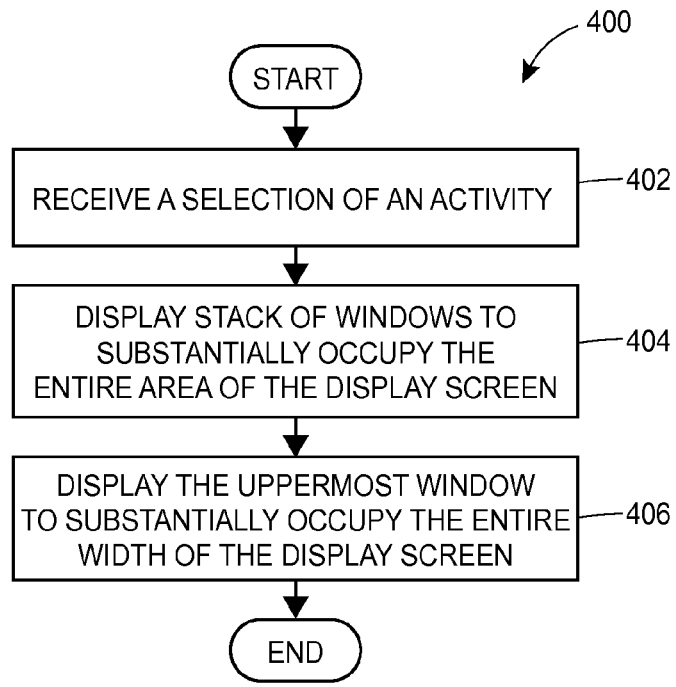
FIG. 11 is a flow diagram of another method for displaying information within several windows on the display screen.

An alternative implementation of the displayed stack of windows is illustrated in FIGS. 9A-9C, which is similar in all aspects to the implementation described in FIGS. 8A-8C, except for the reduction within in the area (i.e., width) of the header segments 60 of underlying windows within the stack of windows. As illustrated in FIG. 9C, the size of the text and/or images in the header segment of the uppermost window 68 may be the same as in the header segment of each underlying window. Accordingly, in one implementation, the header segments 60 of the underlying windows may occupy more space on the screen, and it may appear that less screen space has been allocated to the uppermost window 68 as compared to the arrangement of windows in FIG. 8C.

The recognizability of the content information within all header segments 60 of the displayed windows 64, 66, and 68 provided by the semi-transparent display of any combination of header segments 60 enhances the positional awareness of the viewer's location within the stack of windows. Thus, after several successive window selections, e.g., a category, a subcategory, and a sub-subcategory, the user remains visually aware of the "history" of arriving at the uppermost window, and can easily reverse the selection process. In addition, the sequential reduction in the header segment area of underlying windows may improve the readability of the information displayed within the stack of windows on the display screen 32 by subtly steering the viewer's attention to the information presented in the uppermost displayed window of the stack of windows and reducing extraneous visual noise that may be attributed to the underlying windows previously displayed on the display screen 32.

It is further noted that the arrangement of windows 60 discussed above efficiently utilizes limited screen real estate of a typical mobile device. In particular, arranging several windows in a stacked form allows multiple windows to remain partially visible while allocating most of the screen area to the uppermost window. Further, rendering one or several header segments in a semi-transparent form and/or progressively reducing the header segments of the underlying windows allows the header portion of the uppermost displayed screen to occupy a greater portion of the screen area with respect to the other header portions.

In another implementation, the header segment 60 of any window may include a lateral movement indicator(s) where utilization of the lateral movement indicator provides for the sequential display of information pertaining to a group of articles. For example, when viewing the third window of information, which displays information pertaining to one entity within a group of entities, movement to another entity within the group for the purpose of displaying the entity information on the display screen is provided for through the utilization of the lateral movement indicators in the header segment. That is, user engagement with the lateral indicator will enable the sequential display of information of each entity within the group without being required to dismiss or "pop off" the third, uppermost, displayed window, scroll through the content segment of the second window, and then select another entity to display a third window. An extension of this lateral navigation aspect through a group of entities is also contemplated by a further implementation where lateral navigation amongst categories, subcategories, and sub-subcategories associated with a common geographic area is provided. The lateral navigation through the categories, subcategories, and sub-subcategories displayed on the display screen 32 may be invoked through a finger swipe atop the touch-sensitive display screen or through activation of other components of the user interface 30

In addition, the header segment may include a color and/or be shaded so as to designate a particular activity, e.g., teal for shopping, cobalt for night life, and burgundy for dining. The color displayed in the header segment 60 will be consistent throughout the other displayed windows in the stack that pertain to the same or similar activity or, more generally, a similar category, sub-category, or sub-subcategory of information.

Referring again to FIGS. 2, 8A-8D, and 9A-9C, FIG. 10 is a flow diagram of an example method 300 for displaying information within several windows on a display screen 32 of a mobile computing device 10 or a similar computing device. A request for information is received at a user interface 30 of the mobile computing device 10 at a block 302. Information responsive to the request is acquired by the mobile computing device 10. The acquired information may be received from a server device 38 and its database 40 and include location-based information pertaining to a geographic location associated with the mobile computing device 10. A navigation module interface 42 displays the received information through a plurality of windows on the display screen 32 at a block 306. Each window displayed on the display screen 32 includes a header segment 60. During the display of the stack of windows, the header segment of one or more windows within the stack of windows may be displayed in a semi-transparent form at a block 308.

Referring again to FIGS. 2, 8A-8D, and 9A-9C, FIG. 11 is flow diagram of another method 400 for displaying information within several windows on a display screen 32 of a mobile computing device 10. The method 400 includes receiving the selection of an activity at a block 402. The activity may be selected at the user interface 30 of the mobile computing device 10. Information associated with the activity is displayed by the navigation module interface 42 within a stack of windows on the display screen at a block 404. The displayed stack of windows substantially occupies the entire area of the display screen 32. At a block 406, the uppermost window of the stack of windows is displayed in such a manner as to substantially occupy the entire width of the display screen 32.

It is apparent from the description above that considerable amounts of information can be effectively presented on smaller screens commonly used with portable devices through the use of a radial list and a hierarchical stack of windows. The information may be compiled and presented in accordance with a variety of categorizations and user preferences and characteristics.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs)).

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for a system and a process for rendering information on a mobile computing device having a display screen through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of providing location-based information via a user interface of a portable device, the method comprising:
   receiving, at the portable device, location-based information including an indication of entities available at a plurality of geographic areas proximate to a geographic point location associated with the portable device;
   displaying, via the user interface, a radial list including a plurality of selectable items, including displaying each of the plurality of selectable items inside a respective shape radially positioned about a hub, wherein each of the plurality of selectable items represents a respective group of entities associated with a respective common geographic area; and
   displaying an activity indicator associated with the respective shape of each selectable item, the activity indicator including an icon representing an activity available at one entity located within the geographic area associated with the respective selectable item.

2. The method of claim 1, wherein displaying the radial list including the plurality of selectable items includes displaying the radial list to appear on a display screen in a perspective view.

3. The method of claim 2, wherein displaying the radial list including the plurality of selectable items includes animating the radial list to present a visual effect that the plurality of selectable items appear to revolve about the hub on the display screen.

4. The method of claim 3, wherein animating the radial list to present the visual effect that the plurality of selectable items appear to revolve about the hub on the display screen includes varying a dimension of the shape of at least one selectable item to contain content of a specific size such that placement of all selectable items simultaneously containing content of the specific size within the radial list on the display screen exceeds a boundary of the display screen, and wherein content contained within selectable items appearing in a forefront of the display screen is larger than content contained within selectable items appearing elsewhere.

5. The method of claim 2, wherein animating the radial list includes displaying at least one selectable item containing a content having a size wherein a portion of the shape of the particular selectable item exceeds a boundary of the display screen during revolution about a hub and the portion of the shape of the particular selectable item appears to leave the display screen and return to the display screen.

6. The method of claim 1, wherein displaying the radial list including the plurality of selectable items includes:
   associating, at the mobile computing device, the hub with the geographic point location associated with the portable device; and
   orientating, at the user interface, the position of a particular selectable item about the hub on a display screen to represent the directional relationship between the geographic area represented by the particular selectable item and the geographic point location associated with the portable device.

7. The method of claim 1, further comprising:
   determining an amount of entities providing a particular activity within the geographic area associated with a particular selectable item;
   comparing the amount of entities providing the particular activity within the geographic area to a threshold value;
   displaying the icon representative of the particular activity within the particular selectable item in response to the amount of entities providing the particular activity exceeding the threshold value.

8. The method of claim 7, further comprising:
   receiving, from the user interface, a selection of one of the plurality of selectable items;
   in response to receiving the selection of one of the plurality of selectable items, providing information related to the one or more entities in the associated geographic area that corresponds to the selected one of the plurality of selectable items;
   receiving, from the user interface, a selection of one of a plurality of sub-items; and
   in response to receiving the selection of one of the plurality of sub-items, displaying, at the user interface, information related to a group of one or more entities associated with the selected sub-item amongst a plurality of pages on a display screen, wherein a header segment of each page of the plurality of pages is visible on the display screen to present a visual effect of a stack of layered pages.

9. The method of claim 1, wherein the radial list is the first radial list, the method further comprising:
receiving, via the user interface, a request to display activity information in response to a selection of a particular selectable item displayed in the first radial list; and
displaying, via the user interface, a second radial list including a plurality of selectable sub-items, including displaying each of the plurality of selectable sub-items inside a respective shape radially positioned about a second hub, wherein each of the plurality of selectable sub-items represents a respective group of one or more entities associated with a common activity.

10. The method of claim 1, further comprising:
determining a distance between the geographic point location and a central location of at least one geographic area;
displaying a distance indicator associated with the respective shape of the each selectable item, the distance indicator including an icon representing the determined distance between the geographic point location and the central location of the at least one geographic area.

11. The method of claim 1, wherein the radial list further includes a navigation aid, the method further comprising:
associating the navigation aid with a particular selectable item;
detecting a selection of the particular selectable item; and
in response to detecting the selection of the navigation aid, providing an interface for specifying a new geographic point location.

12. A method of providing location-based information via a user interface of a portable device, the method comprising:
receiving, at the portable device, location-based information including an indication of entities available at a plurality of geographic areas proximate to a geographic point location associated with the portable device;
displaying, via the user interface, a first radial list of a plurality of selectable items, including displaying each of the plurality of selectable items inside a respective shape radially positioned about a first hub representing the geographic point location associated with the portable device, wherein each of the plurality of selectable items represents a respective group of one or more entities associated with a common geographic area;
displaying, via the user interface, a second radial list of a plurality of selectable sub-items, including displaying each of the plurality of selectable sub-items inside a respective shape radially positioned about a second hub, wherein each of the plurality of selectable sub-items represents a respective group of one or more entities associated with a common activity; and
displaying an activity indicator associated with the respective shape of each selectable item or sub-item, the activity indicator including an icon representing an activity available at one entity located within the geographic area associated with the respective selectable item or sub-item.

13. The method of claim 12, wherein displaying the first radial list including the plurality of selectable items includes:
displaying the first radial list to appear on a display screen in a perspective view, and
animating the first radial list to present a visual effect that the plurality of selectable items appear to revolve about the first hub on the display screen.

14. The method of claim 12, wherein displaying the first radial list including the plurality of selectable items includes displaying an activity indicator associated with the respective shape of each selectable item, the activity indicator including an icon representing an activity available at one entity located within the geographic area associated with the respective selectable item.

15. The method of claim 12, further comprising:
determining a distance between the geographic point location and a central location of at least one geographic area;
displaying a distance indicator associated with the respective shape of the each selectable item, the distance indicator including an icon representing the determined distance between the geographic point location and the central location of the at least one geographic area.

16. A mobile computing device capable of displaying location-based information on a display screen, the mobile computing device comprising a processor coupled to a memory and the display screen to:
generate a user interface coupled to the processor and the display screen;
receive, at the mobile computing device, location-based information including an indication of entities available at a plurality of geographic areas proximate to a geographic point location associated with the mobile computing device;
display, via the user interface, a radial list including a plurality of selectable items, including displaying each of the plurality of selectable items inside a respective shape radially positioned about a hub, wherein each of the plurality of selectable items represents a respective group of entities associated with a respective common geographic area; and
display an activity indicator associated with the respective shape of each selectable item, the activity indicator including an icon representing an activity available at one entity located within the geographic area associated with the respective selectable item.

17. The mobile computing device of claim 16, wherein the radial list including the plurality of selectable items is animated to present a visual effect that the selectable items appear to revolve about the hub on the display screen.

18. The mobile computing device of claim 17, wherein each selectable item is associated with a shape, and a dimension of the shape varies to contain content of a specific size such that placement of all selectable items simultaneously containing content of the specific size within the radial list on the display screen exceeds a boundary of the display screen, and wherein content contained within selectable items appearing in a forefront of the display screen is larger than content contained within selectable items appearing elsewhere.

19. The mobile computing device of claim 17, wherein at least one selectable item contains a content having a size wherein a portion of the shape of the particular selectable item exceeds a boundary of the display screen during revolution about a hub and the portion of the shape of the particular selectable item appears to leave the display screen and return to the display screen.

20. The mobile computing device of claim 16, further comprising:
an activity indicator associated with the respective shape of each selectable item, the activity indicator including an icon representing an activity available at one entity located within the geographic area associated with the respective selectable item.

* * * * *